United States Patent
Narasimha et al.

(10) Patent No.: US 12,010,548 B2
(45) Date of Patent: Jun. 11, 2024

(54) APPARATUS AND METHOD FOR CONGESTION HANDLING IN RADIO ACCESS NETWORK

(71) Applicant: Apple Inc., Cupertino, CA (US)

(72) Inventors: Murali Narasimha, Lake Osweg, OR (US); Jaemin Han, Portland, OR (US); Candy Yiu, Portland, OR (US); Alexander Sirotkin, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/274,116

(22) PCT Filed: Sep. 5, 2019

(86) PCT No.: PCT/CN2019/104556
§ 371 (c)(1),
(2) Date: Mar. 5, 2021

(87) PCT Pub. No.: WO2020/048510
PCT Pub. Date: Mar. 12, 2020

(65) Prior Publication Data
US 2021/0211928 A1    Jul. 8, 2021

Related U.S. Application Data

(60) Provisional application No. 62/728,649, filed on Sep. 7, 2018.

(51) Int. Cl.
*H04W 28/02*    (2009.01)
*H04W 28/086*    (2023.01)
*H04W 88/14*    (2009.01)

(52) U.S. Cl.
CPC ... *H04W 28/0284* (2013.01); *H04W 28/0273* (2013.01); *H04W 28/0862* (2023.05); *H04W 88/14* (2013.01)

(58) Field of Classification Search
CPC ......... H04W 28/0205; H04W 28/0273; H04W 28/0284; H04W 28/0812; H04W 88/085; H04W 88/14
See application file for complete search history.

(56) References Cited

U.S. PATENT DOCUMENTS 9,894,602 B1 *    2/2018  Manchanda .......... H04W 48/16
2008/0125139 A1 *  5/2008  Ishizaki ................. H04L 47/10
                                                      455/453

(Continued)

FOREIGN PATENT DOCUMENTS

CN    102227934 A    10/2011
CN    104380803 A    2/2015

(Continued)

OTHER PUBLICATIONS

International Search Report directed to related International Patent Application PCT/CN2019/104556, dated Nov. 29, 2019.

(Continued)

*Primary Examiner* — Stephen J Clawson
(74) *Attorney, Agent, or Firm* — Sterne, Kessler, Goldstein & Fox P.L.L.C.

(57) ABSTRACT

Provided herein is an apparatus and a method for congestion handling in RAN. The disclosure provides an apparatus for a relay node in a RAN including the relay node and a donor node providing an interface to a core network and a backhaul link to the relay node. The apparatus includes a RF interface to receive and transmit downlink data for one or more UEs or UE bearers; and a processing circuitry coupled with the RF interface. The processing circuitry is to determine a downlink congestion occurs at the relay node; and generate a downlink congestion indication to identify a UE or a UE bearer or a backhaul RLC channel affected by the downlink congestion. The RF interface is to transmit the downlink congestion indication to the donor node. In addition to the (Continued)

downlink congestion handling, the relay node can also be to handle uplink congestion in a similar way.

20 Claims, 18 Drawing Sheets

(56) References Cited

U.S. PATENT DOCUMENTS

| | | | |
|---|---|---|---|
| 2010/0208674 A1* | 8/2010 | Lee | H04W 36/0088 370/329 |
| 2014/0204754 A1* | 7/2014 | Jeong | H04W 28/0231 370/235 |
| 2015/0155930 A1 | 6/2015 | Liu et al. | |
| 2016/0234752 A1* | 8/2016 | Hsu | H04L 12/4641 |
| 2017/0311200 A1* | 10/2017 | Koskinen | H04W 76/27 |
| 2020/0068581 A1* | 2/2020 | Xu | H04W 72/085 |
| 2021/0075547 A1* | 3/2021 | Tao | H04L 1/187 |
| 2021/0237888 A1* | 8/2021 | Wong | G05D 1/101 |

FOREIGN PATENT DOCUMENTS

| | | | |
|---|---|---|---|
| CN | 107736004 A | 2/2018 | |
| WO | WO-2017123812 A1 * | 7/2017 | ............ H04W 48/00 |

OTHER PUBLICATIONS

Intel Corporation, "Flow Control mechanism for DL", 3GPP TSG RAN WG2 Meeting #106 R2-1906353, May 17, 2019 (May 17, 2019), the "Discussion" section.

Intel Corporation, "Flow Control mechanism for UL", 3GPP TSG RAN WG2 Meeting #106 R2-1906354, May 17, 2019 (May 17, 2019), the "Discussion" section.

LG Electronics Inc., "Summary of IAB Flow Control and Congestion Handling", 3GPP TSG-RAN WG2 #103 R2-1812518, Aug. 24, 2018 (Aug. 24, 2018), sections 2-3.

First Chinese Office Action directed to related Chinese Application No. 2019800574149, with English-language translation of the Search Report and machine translation of the Office Action attached, dated Oct. 9, 2023; 20 pages.

* cited by examiner

APPARATUS AND METHOD FOR CONGESTION HANDLING IN RADIO ACCESS NETWORK

PRIORITY DECLARATION

This application is a national phase entry of PCT/CN2019/104556, filed on Sep. 5, 2019, which claims priority to U.S. Provisional Application No. 62/728,649, filed on Sep. 7, 2018, both of which are hereby incorporated by reference in their entireties.

TECHNICAL FIELD

Embodiments of the present disclosure generally relate to wireless communication, and in particular to an apparatus and a method for congestion handling in a Radio Access Network (RAN).

BACKGROUND ART

In the RAN, there may be a plurality of RAN nodes serving a plurality of User Equipments (UEs). Among the plurality of RAN nodes, a donor node may be configured to provide an interface to a core network (CN) for the UEs and provide backhaul links to intermediate nodes in the RAN, and the intermediate nodes may serve as both access nodes to the UEs and provide backhaul links to other intermediate nodes and the donor nodes. A multi-hop routing may be enabled via the intermediate nodes between the donor node and the UEs. In a multi-hop backhaul, congestion may occur on the intermediate nodes. In order to mitigate congestion and packet dropping, an efficient flow control to handle congestion is required in the RAN.

SUMMARY

An aspect of the disclosure provides an apparatus for a relay node in a Radio Access Network (RAN), including: a radio frequency (RF) interface to receive and transmit downlink data for one or more UEs or UE bearers; and processing circuitry coupled with the RF interface, wherein the processing circuitry is to: determine a downlink congestion occurs at the relay node; and generate a downlink congestion indication to identify a UE, a UE bearer, or a backhaul Radio Link Control (RLC) channel affected by the downlink congestion, and the RF interface is to transmit the downlink congestion indication to a donor node in the RAN.

An aspect of the disclosure provides an apparatus for a donor node in a Radio Access Network (RAN), including: a radio frequency (RF) interface to receive a downlink congestion indication from a relay node in the RAN when a downlink congestion occurs at the relay node, wherein the downlink congestion indication is to identify a UE, a UE bearer, or a backhaul Radio Link Control (RLC) channel affected by the downlink congestion; and processing circuitry coupled with the RF interface, wherein the processing circuitry is to: limit downlink data for the UE, the UE bearer, or the backhaul RLC channel affected by the downlink congestion based on the downlink congestion indication.

An aspect of the disclosure provides a non-transitory computer-readable medium having instructions stored thereon, the instructions, when executed by one or more processors of a relay node in a Radio Access Network (RAN), causing the one or more processors to: determine an uplink congestion occurs at the relay node; generate an uplink congestion indication to identify a UE or a UE bearer or a backhaul Radio Link Control (RLC) channel affected by the uplink congestion; and transmit the uplink congestion indication to a serving node in the RAN that serves the UE or the UE bearer or the backhaul RLC channel identified in the uplink congestion indication.

An aspect of the disclosure provides an apparatus for a serving node in a Radio Access Network (RAN), including: a radio frequency (RF) interface to receive an uplink congestion indication from the relay node when an uplink congestion occurs at the relay node and affects uplink data for a UE or one or more bearers of the UE served by the serving node, wherein the uplink congestion indication is to identify the UE or the one or more bearers of the UE or a backhaul Radio Link Control (RLC) channel for the one or more bearers of the UE; and a processing circuitry coupled with the RF interface, wherein the processing circuitry is to: limit uplink data for the UE or the one or more bearers of the UE or the backhaul RLC channel based on the uplink congestion indication.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Relational terms such as first, second and the like are used herein only to distinguish an entity or operation from another entity or operation without requiring or implying that there is any such actual relationship or order between these entities or operations.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In the Radio Access Network (RAN), there may be a plurality of RAN nodes serving a plurality of UEs. Among the plurality of RAN nodes, a donor node may be configured to provide an interface to a core network (CN) for the UEs and provide backhaul links to intermediate nodes in the RAN, and the intermediate nodes may serve as both access nodes to the UEs and provide backhaul links to other intermediate nodes and the donor nodes. A multi-hop routing may be enabled via the intermediate nodes between the donor node and the UEs.

Especially, in New Radio (NR) systems, an Integrated Access and Backhaul (IAB) architecture is proposed to enable flexible and very dense deployment of NR cells without densifying the transport network proportionately. In the following description, the embodiments of the present disclosure will be illustrated in the context of an IAB network as an example of the RAN, although the embodiments of the present disclosure may also be implemented in other networking architectures.

Figure 1:
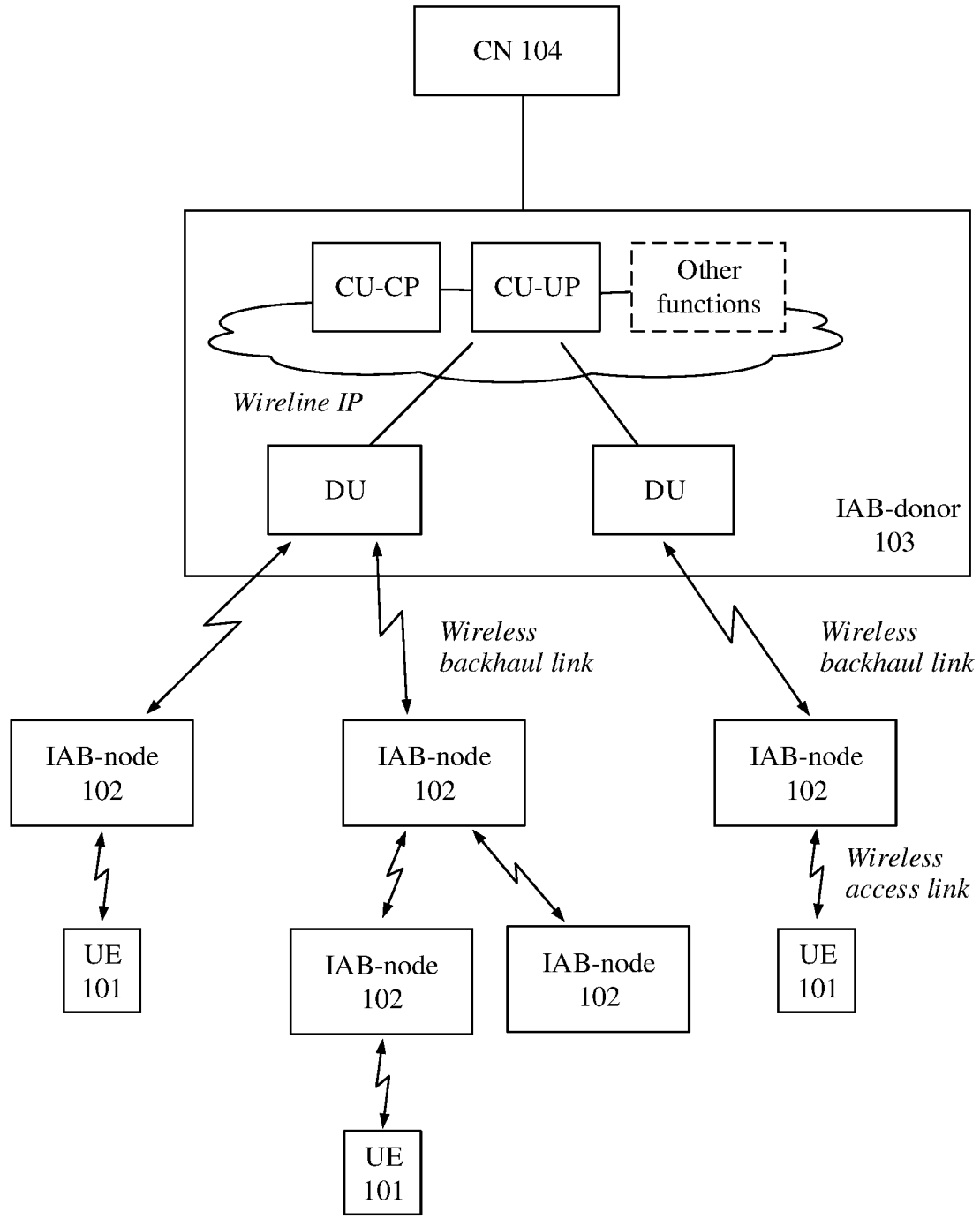
FIG. 1 illustrates an example Integrated Access and Backhaul (IAB) architecture in accordance with various embodiments of the present disclosure.

FIG. 1 illustrates an example Integrated Access and Backhaul (IAB) architecture in accordance with various embodiments of the present disclosure. FIG. 1 is a reference diagram for IAB in standalone operation mode (SA mode), which contains one IAB donor 103 (also referred to as an "anchor node" or the like) and multiple IAB nodes 102 (also referred to as IAB relay nodes (RNs), relay Transmission/Reception Points (rTRPs), or the like). The IAB donor 103 is treated as a single logical node that comprises a set of functions such as gNB Distributed Unit (gNB-DU), gNB Central Control Plane (gNB-CU-CP), gNB Central User Plane (gNB-CU-UP) and potentially other functions. In some implementations, the IAB donor 103 can be split according to the aforementioned functions, which can all be either collocated or non-collocated as allowed by 3GPP Next Generation RAN (NG-RAN) architecture. Some of the functions presently associated with the IAB donor 103 may be moved outside of the IAB donor 103.

In FIG. 1, various UEs 101 access TAB nodes. An TAB node 102 is a network node in an TAB deployment having UE and (at least part of) gNB functions. As shown by FIG. 1, some TAB nodes 102 access other TAB nodes 102, and some TAB nodes 102 access an IAB donor 103. An IAB donor 103 is a network node in an TAB deployment that terminates NG interfaces via wired connection(s). The IAB donor 103 is a RAN node that provides a UE's interface to a core network (CN) 104 and wireless backhauling functionality to TAB nodes 102. An TAB node 102 is a relay node and/or a RAN node that supports wireless access to UEs 101 and wirelessly backhaul access traffic.

TAB strives to reuse existing functions and interfaces defined for access. In particular, Mobile-Termination (MT), gNB-DU, gNB-CU, User-Plane-Function (UPF), Access-and-Mobility-Management Function (AMF) and Session-Management-Function (SMF) as well as the corresponding interfaces NR Uu (between MT and gNB), F1, NG, X2 and N4 are used as baseline for the TAB architectures. Modifications or enhancements to these functions and interfaces for the support of TAB will be explained in the context of the architecture discussion. The Mobile-Termination (MT) function has been defined as a component of the Mobile Equipment. In the context of TAB, MT is referred to as a function residing on an TAB node 102 that terminates the radio interface layers of the backhaul Uu interface toward the IAB donor 103 or other TAB nodes 102. Additional functionality, such as multi-hop forwarding, is included in the architecture.

TAB nodes 102 can operate in SA or non-SA (NSA) mode. When operating in NSA mode, the TAB node 102 only uses the NR link for backhauling. The UE 101 connecting to an TAB node 102 may choose a different operation mode than the TAB node 102. The UE 101 may further connect to a different type of core network than the TAB node 102 it is connected to. TAB nodes 102 operating in NSA mode may be connected to the same or to different eNBs. UEs 101 that also operate in NSA-node may connect to the same or to a different eNB than the TAB node to which they are connected.

Figure 2:
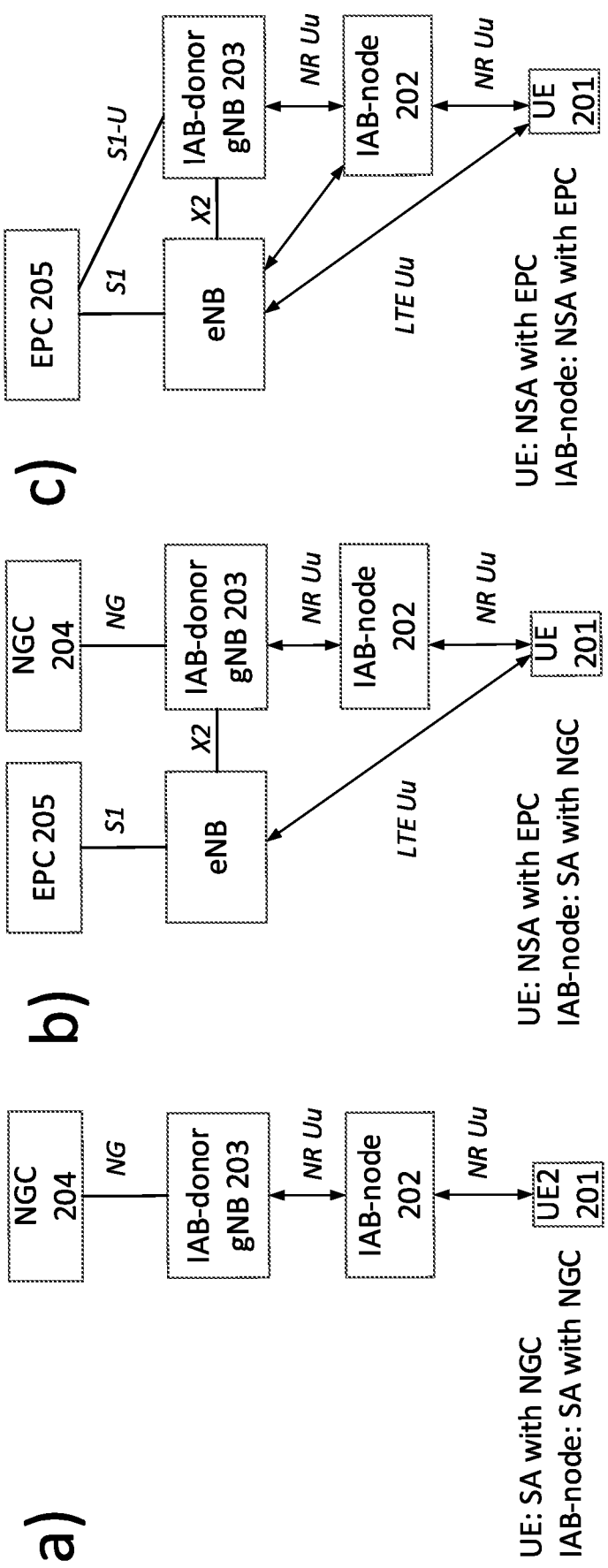
FIG. 2 illustrates examples for operations of IAB nodes in SA and NSA mode in accordance with various embodiments of the present disclosure.

FIG. 2 illustrates examples for operations of JAB nodes in SA and NSA mode in accordance with various embodiments of the present disclosure.

Examples for operation in SA and NSA mode include: (1) the UEs 201 and JAB nodes 202 operate in SA mode with NGCore (NGC) 204; (2) UEs 201 operate in NSA mode with Evolved Packet Core (EPC) 205 while JAB nodes 202 operates in SA mode with NGC 204; and (3) UEs 201 and JAB nodes 202 operate in NSA mode with EPC 205. For the third example, the UEs 201 and JAB nodes 202 operate in NSA mode with EPC 205, and the JAB node 202 may use the Long Term Evolution (LIE) leg for JAB node initial access and configuration, topology management, route selection, and resource partitioning.

In embodiments where multi-hop and topology adaptation are supported, the JAB nodes 202 include topology management mechanisms and route selection and optimization (RSO) mechanisms. Topology management mechanisms include protocol stacks, interfaces between rTRPs or JAB nodes, control and user plane procedures for identifying one or more hops in the JAB network, forwarding traffic via one or multiple wireless backhaul links in the JAB network, handling of QoS, and the like. The RSO mechanisms include mechanisms for discovery and management of backhaul links for TRPs with integrated backhaul and access functionalities; RAN-based mechanisms to support dynamic route selection (potentially without core network involvement) to accommodate short-term blocking and transmission of latency-sensitive traffic across backhaul links; and mechanisms for evaluating different resource allocations/ routes across multiple nodes for end-to-end RSO.

The operation of the different links may be on the same frequencies ("in-band") or different frequencies ("out-of-band"). In-band backhauling includes scenarios where access and backhaul links at least partially overlap in frequency creating half-duplexing or interference constraints, which may imply that an IAB node may not transmit and receive simultaneously on both links. By contrast, out-of-band scenarios may not have such constraints. In embodiments, one or more of the TAB nodes 202 include mechanisms for dynamically allocating resources between backhaul and access links, which include mechanisms to efficiently multiplex access and backhaul links (for both Downlink (DL) and Uplink (UL) directions) in time, frequency, or space under a per-link half-duplex constraint across one or multiple backhaul link hops for both Time Division Duplex (TDD) and Frequency Division Duplex (FDD) operation; and cross-link interference (CLI) measurement, coordination and mitigation between rTRPs and UEs.

Architecture Groups and Types

There are five different types of IAB architectures that are divided into two architecture groups. Architecture group 1 comprises architectures 1a and 1b, which include CU/DU split architectures. Architecture 1a includes backhauling of F1-U (F1 User Plane Interface) uses an adaptation layer or GPRS Tunneling Protocol for User Plane (GTP-U) combined with an adaptation layer, and hop-by-hop forwarding across intermediate nodes uses the adaptation layer for operation with NGC or PDN (Packet-Data-Network)-connection-layer routing for operation with EPC. Architecture 1b includes backhauling of F1-U on access node uses GTP-U/UDP (User Datagram Protocol)/IP (Internet Protocol), and hop-by-hop forwarding across intermediate node uses the adaptation layer.

Architecture group 2 comprises architectures 2a, 2b and 2c. Architecture 2a includes backhauling of F1-U or NG-U (Next Generation User Plane) on access node uses GTP-U/ UDP/IP, and hop-by-hop forwarding across intermediate node uses PDU (Protocol Data Unit)-session-layer routing. Architecture 2b includes backhauling of F1-U or NG-U on access node uses GTP-U/UDP/IP, and hop-by-hop forwarding across intermediate node uses GTP-U/UDP/IP nested tunneling. Architecture 2c includes backhauling of F1-U or NG-U on access node uses GTP-U/UDP/IP, and hop-by-hop forwarding across intermediate node uses GTP-U/UDP/IP/ PDCP (Packet Data Convergence Protocol) nested tunneling.

Architecture Group 1

Figures 3A, 3B:
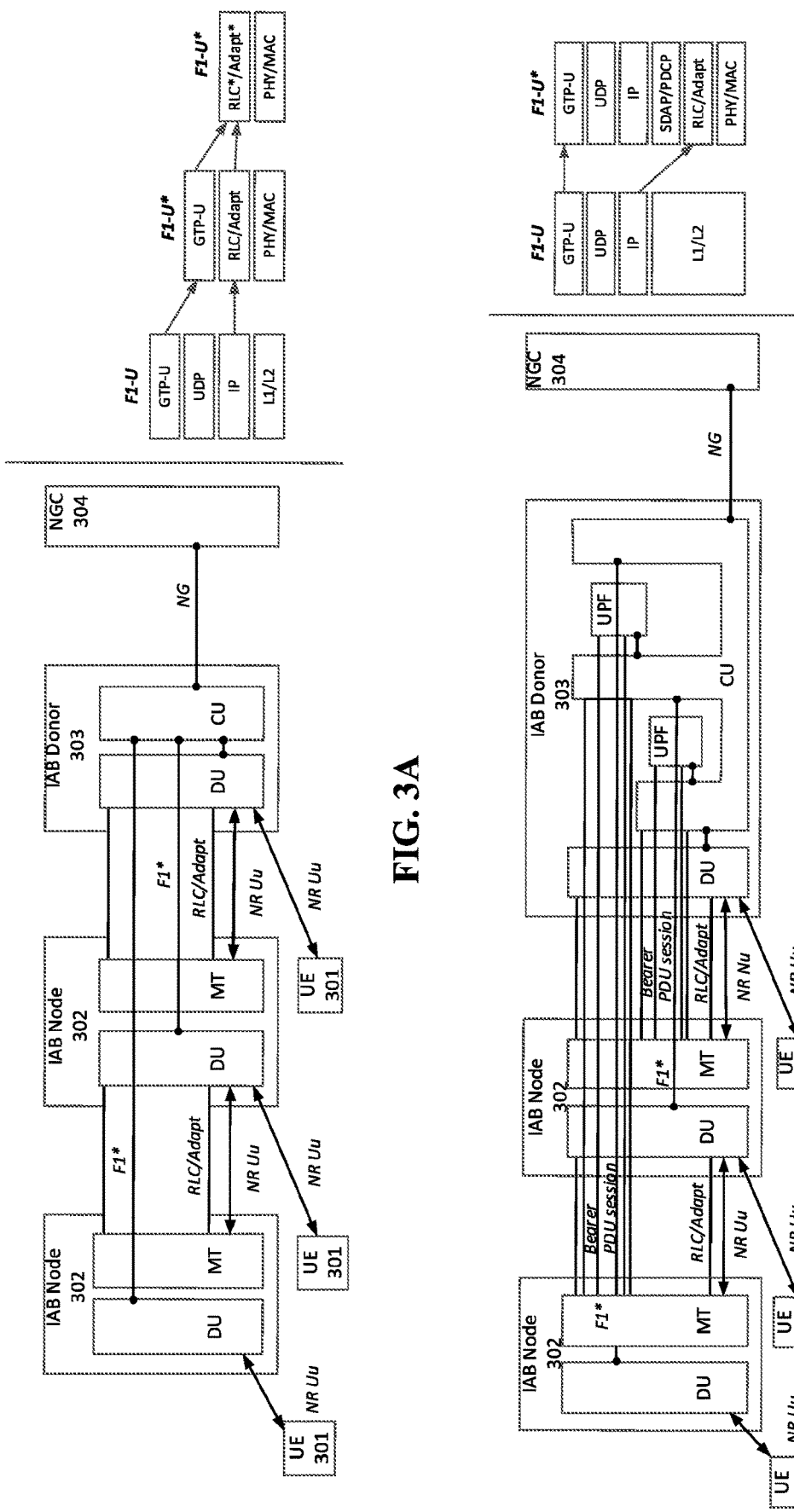
FIG. 3A illustrates a reference diagram for IAB architecture 1a in accordance with various embodiments of the present disclosure.
FIG. 3B illustrates a reference diagram for IAB architecture 1b in accordance with various embodiments of the present disclosure.

FIG. 3A illustrates a reference diagram for IAB architecture 1a in accordance with various embodiments of the present disclosure. As an example, a two-hop chain of IAB-nodes 302 underneath an IAB-donor 303 is illustrated in FIG. 3A, where IAB nodes 302 and UEs 301 connect in SA-mode to an NGC 304.

Architecture 1a leverages CU/DU-split architecture. In this architecture, each IAB node 302 holds a DU and an MT. Via the MT, the IAB node 302 connects to an upstream IAB node 302 or the IAB donor 303. Via the DU, the IAB node 302 establishes RLC-channels to UEs 301 and to MTs of downstream IAB nodes 302. For MTs, this RLC-channel may refer to a modified RLC*. An IAB node 302 can connect to more than one upstream IAB node 302 or IAB donor DU. The IAB node 302 may contain multiple DUs, but each DU part of the IAB node 302 has F1-C (F1 Control Plane Interface) connection only with one IAB donor CU-CP.

The IAB donor 303 also holds a DU to support UEs 301 and MTs of downstream TAB nodes 302. The IAB donor 303 holds a CU for the DUs of all TAB nodes 302 and for its own DU. It is for further study if different CUs can serve the DUs of the TAB nodes 302. Each DU on an TAB node 302 connects to the CU in the IAB donor 303 using a modified form of F1, which is referred to as F1*. F1*-U runs over RLC channels on the wireless backhaul between the MT on the serving TAB node 302 and the DU on the donor 303. F1*-U transport between MT and DU on the serving TAB node 302 as well as between DU and CU on the donor 303 is for future study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop. The F1*-U protocol stacks for this architecture include enhancements of RLC (referred to as RLC*). The MT of each TAB node 302 further sustains NAS connectivity to the NGC 304, e.g., for authentication of the TAB node 302, and sustains a PDU-session via the NGC 304, e.g., to provide the TAB node 302 with connectivity to the OAM (Operation Administration and Maintenance).

For NSA operation with EPC, the MT is dual-connected with the network using E-UTRA-NR Dual Connectivity (EN-DC). The TAB node's MT sustains a PDN connection with the EPC, e.g., to provide the TAB node 302 with connectivity to the OAM.

FIG. 3B illustrates a reference diagram for TAB architecture 1b in accordance with various embodiments of the present disclosure. As an example, a two-hop chain of TAB-nodes 302 underneath an TAB-donor 303 is illustrated in FIG. 3B, where TAB nodes 302 and UEs 301 connect in SA-mode to an NGC 304.

Architecture 1b also leverages CU/DU-split architecture. In this architecture, the IAB donor 303 only holds one logical CU. An TAB node 302 can connect to more than one upstream TAB node 302 or IAB donor DU. The TAB node 302 may contain multiple DUs, but each DU part of the TAB node 302 has F1-C connection only with one IAB donor CU-CP.

In this architecture, each TAB node 302 and the IAB donor 303 hold the same functions as in architecture 1a. Also, as in architecture 1a, every backhaul link establishes an RLC-channel, and an adaptation layer is inserted to enable hop-by-hop forwarding of F1*.

Opposed to architecture 1a, the MT on each IAB node 302 establishes a PDU-session with a UPF residing on the donor. The MT's PDU-session carries F1* for the collocated DU. In this manner, the PDU-session provides a point-to-point link between CU and DU. On intermediate hops, the PDCP-PDUs of F1* are forwarded via adaptation layer in the same manner as described for architecture 1a.

For NSA operation with EPC, the MT is dual-connected with the network using EN-DC. In this case, the IAB node's MT sustains a PDN connection with a Local Gateway (L-GW) residing on the donor.

Architecture Group 2

Figure 3C:
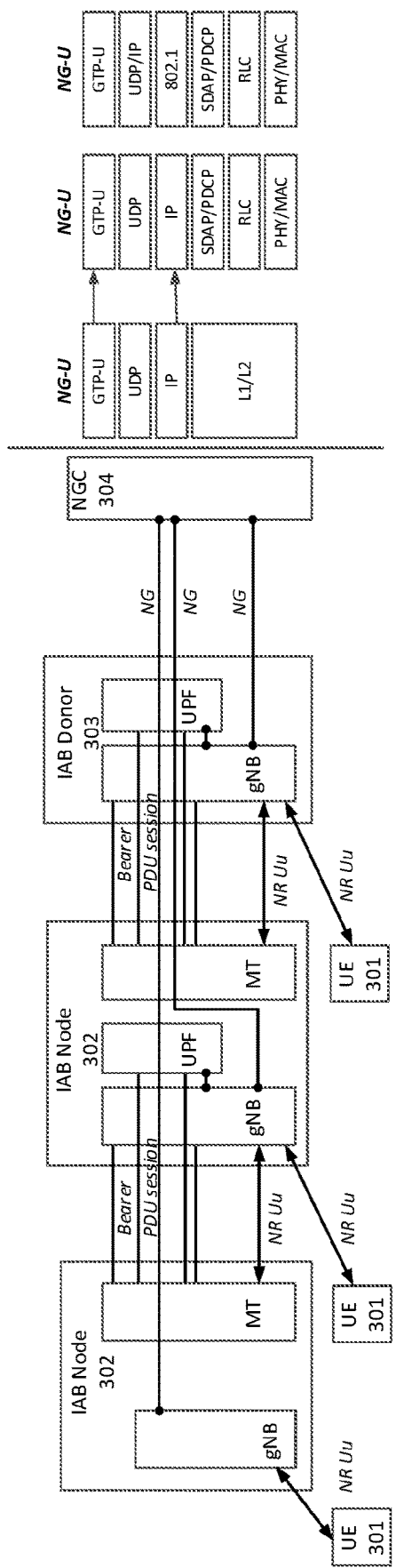
FIG. 3C illustrates a reference diagram for IAB architecture 2a in accordance with various embodiments of the present disclosure.

FIG. 3C illustrates a reference diagram for IAB architecture 2a in accordance with various embodiments of the present disclosure. As an example, a two-hop chain of IAB-nodes underneath an IAB-donor is illustrated in FIG. 3C.

In architecture 2a, UEs 301 and IAB nodes 302 connect in SA-mode to an NGC 304. In this architecture, the IAB node 302 holds an MT to establish an NR Uu link with a gNB on the parent IAB node 302 or IAB donor 303. Via this NR-Uu link, the MT sustains a PDU-session with a UPF that is collocated with the gNB. In this manner, an independent PDU-session is created on every backhaul link. Each IAB node 302 further supports a routing function to forward data between PDU-sessions of adjacent links. This creates a forwarding plane across the wireless backhaul. Based on PDU-session type, this forwarding plane supports IP or Ethernet. In case PDU-session type is Ethernet, an IP layer can be established on top. In this manner, each IAB node 302 obtains IP-connectivity to the wireline backhaul network. An IAB node 302 can connect to more than one upstream IAB node 302 or IAB donor 303.

All IP-based interfaces such as NG, Xn, F1, N4, etc. are carried over this forwarding plane. In the case of F1, the UE-serving IAB node 302 would contain a DU for access links in addition to the gNB and UPF for the backhaul links. The CU for access links would reside in or beyond the IAB donor 303. The NG-U protocol stack for IP-based and for Ethernet-based PDU-session type may be used for this architecture.

In case the IAB node 302 holds a DU for UE-access, it may not be required to support PDCP-based protection on each hop since the end user data will already be protected using end to end PDCP between the UE and the CU.

For NSA operation with EPC, the MT is dual-connected with the network using EN-DC. In this case, the JAB node's MT sustains a PDN-connection with an L-GW residing on the parent JAB node 302 or the IAB donor 303. All IP-based interfaces such as S1, S5, X2, etc. are carried over this forwarding plane.

Figure 3D:
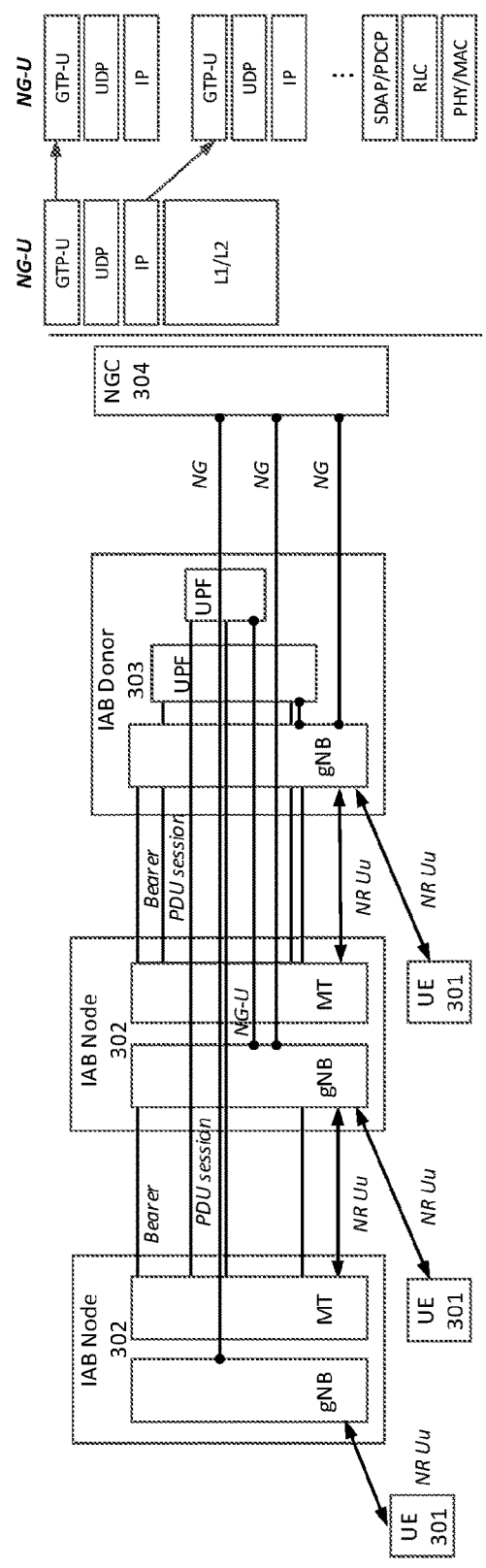
FIG. 3D illustrates a reference diagram for IAB architecture 2b in accordance with various embodiments of the present disclosure.

FIG. 3D illustrates a reference diagram for JAB architecture 2b in accordance with various embodiments of the present disclosure. As an example, a two-hop chain of IAB-nodes underneath an IAB-donor is illustrated in FIG. 3D, where TAB nodes 302 and UEs 301 connect in SA-mode to an NGC 304.

In architecture 2b, the IAB node 302 holds an MT to establish an NR Uu link with a gNB on the parent TAB node 302 or IAB donor 303. Via this NR-Uu link, the MT sustains a PDU-session with a UPF. Opposed to architecture 2a, this UPF is located at the IAB donor 303. Also, forwarding of PDUs across upstream TAB nodes 302 is accomplished via tunneling. The forwarding across multiple hops therefore creates a stack of nested tunnels. As in architecture 2a, each TAB node 302 obtains IP-connectivity to the wireline backhaul network. All IP-based interfaces such as NG, Xn, F1, N4, etc. are carried over this forwarding IP plane. An TAB node 302 can connect to more than one upstream TAB node 302 or IAB donor 303.

For NSA operation with EPC, the MT is dual-connected with the network using EN-DC. In this case, the IAB node's MT sustains a PDN-connection with an L-GW residing on the IAB donor 303.

Figure 3E:
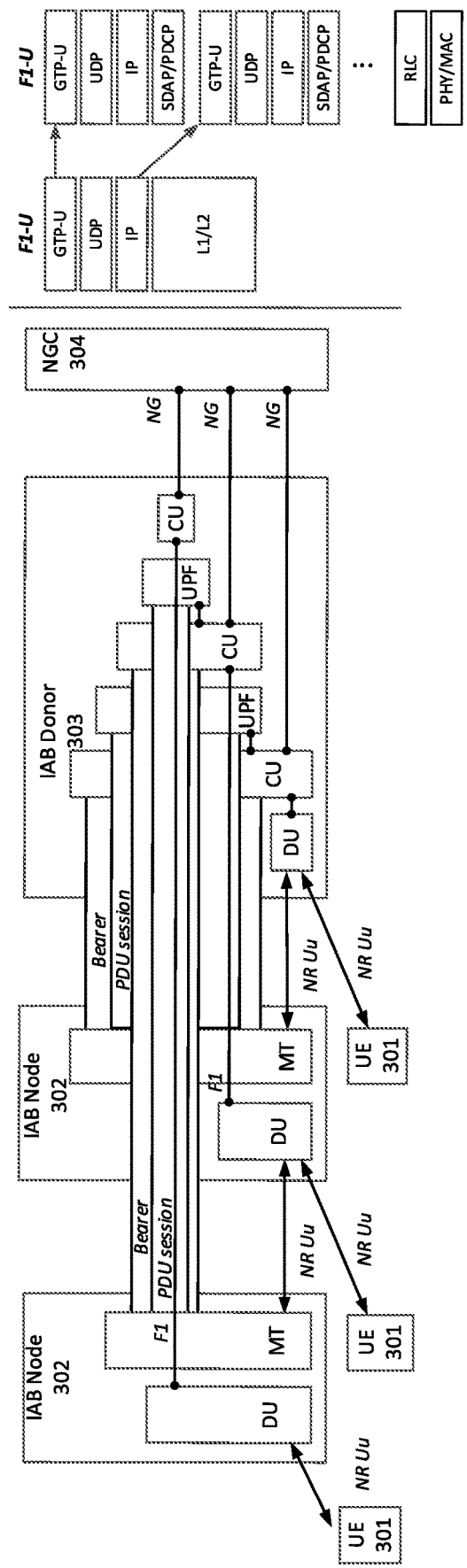
FIG. 3E illustrates a reference diagram for IAB architecture 2c in accordance with various embodiments of the present disclosure.

FIG. 3E illustrates a reference diagram for TAB architecture 2c in accordance with various embodiments of the present disclosure. As an example, a two-hop chain of IAB-nodes underneath an IAB-donor is illustrated in FIG. 3E, where TAB nodes 302 and UEs 301 connect in SA-mode to an NGC 304.

Architecture 2c leverages DU-CU split. The TAB node 302 holds an MT which sustains an RLC-channel with a DU on the parent TAB node 302 or IAB donor 303. The IAB donor 303 holds a CU and a UPF for each TAB node's DU. The MT on each TAB node 302 sustains a NR-Uu link with a CU and a PDU session with a UPF on the donor. Forwarding on intermediate nodes is accomplished via tunneling. The forwarding across multiple hops creates a stack of nested tunnels. As in architecture 2a and 2b, each TAB node 302 obtains IP-connectivity to the wireline backhaul network. Opposed to architecture 2b, however, each tunnel includes an SDAP (Service Data Adaptation Protocol)/PDCP layer. All IP-based interfaces such as NG, Xn, F1, N4, etc. are carried over this forwarding plane. An TAB node 302 can connect to more than one upstream IAB node 302 or IAB donor 303.

For NSA operation with EPC, the MT is dual-connected with the network using EN-DC. In this case, the IAB node's MT sustains a PDN-connection with an L-GW residing on the IAB donor 303.

Multi-Hop Backhauling

In embodiments, the IAB system architecture supports multi-hoping backhauling. IAB multi-hop backhauling provides more range extension than single hopping systems. Multi-hop backhauling further enables backhauling around obstacles (e.g., buildings in urban environment for in-clutter deployments). The maximum number of hops in a deployment may depend on many factors such as frequency, cell density, propagation environment, traffic load, various Key Performance Indicators (KPIs), and/or other like factors. Additionally, the weights assigned to each of these factors may change dynamically over time. With increasing number of hops, scalability issues may arise and limit performance or increase signaling load to unacceptable levels; therefore, scalability to hop-count may be considered as an important KPI for planning and deployment purposes. In some implementations, there may be no limits on the number of backhaul hops Topology Adaptation The IAB system architecture also supports topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB nodes and/or mobile IAB nodes. Also, traffic variations can create uneven load distribution on wireless backhaul links leading to local link or node congestion. In various implementations, topology adaptation for physically fixed IAB nodes is supported to enable robust operation to mitigate blockage and load variation on backhaul links.

In a multi-hop backhaul, congestion may occur on the intermediate nodes. In order to mitigate congestion and packet dropping, an efficient flow control to handle congestion is required in the RAN. The main goal of flow control is to control an incoming data rate at a congested node so that packets are not dropped due to buffer overflowing at the congested node. In other words, flow control tries to ensure that the incoming data rate matches the capacity of the link(s) over which the data has to travel.

For example, in a downlink transmission, when a route consists of a sequence of links Donor→Node1→Node2→Node3, Node1 may not know when a downlink buffer at Node2 is approaching an overflow condition. Such a situation would occur when the link Node2→Node3 is congested. In this situation, a "back-pressure" mechanism may be used to perform the flow control for congestion handling. The "back-pressure" mechanism tries to slow the incoming data from the donor node traveling over the link Node2→Node3. When Node2 is congested (i.e., the downlink buffer at Node2 is approaching the overflow condition), according to the "back-pressure" mechanism, Node 2 will notify Node1 that the downlink buffer at Node2 is approaching the overflow condition. Congestion at Node2 may occur due to for example a reduced capacity on the link Node2→Node3. In response to the notification from Node2, Node1 may limit the data to be transmitted to Node2. If the congestion status at Node2 continues, a buffer at Node1 may also approach an overflow condition. Then, Node1 may inform the donor node of its buffer overflow condition, resulting in the donor node limiting data transmissions from the donor node to Node1.

According to the "back-pressure" mechanism, congestion may be experienced along a route as a slow progression due to the need for the buffers at the nodes along the route to each fill up in succession. For example, if Node1 transmits a significant amount of data to Node2 before the congestion arrives at Node2, the buffer at Node2 may overflow.

A similar congestion situation may occur on an uplink route, e.g. a route including a sequence of links Node3→Node2→Node1→Donor. That is, congestion on the link Node1→Donor may cause an uplink buffer at Node1 to overflow. However, for uplink traffic, Node1 can mitigate the risk of buffer overflow by allocating fewer uplink resources for the transmission from Node2 to Node1 (referred to as "implicit back-pressure"). This can however lead to a buffer overflow risk at Node2. In response, Node2 may allocate fewer uplink resources for the transmission from Node3 to Node2, and this may lead to a peristaltic progression of the congestion down the route. If the data rate injected into Node3 is high, this slow back-pressure mechanism is likely unable to avoid buffer overflows.

Figure 4:
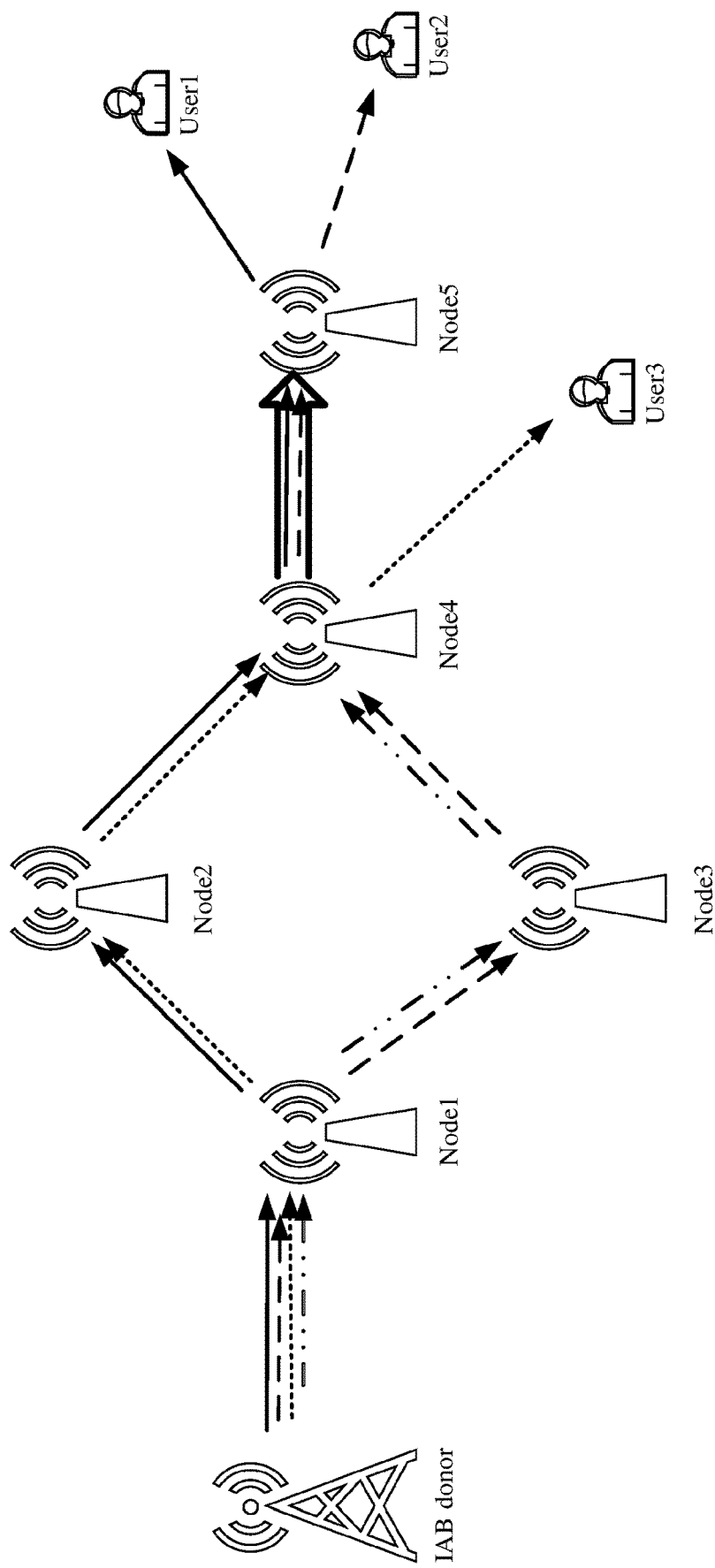
FIG. 4 illustrates a downlink transmission scenario in an example IAB network with five IAB nodes.

FIG. 4 illustrates a downlink transmission scenario in an example IAB network with five IAB nodes. The description about the flow control for downlink congestion handling will be provided below with reference to the example IAB network as shown.

As shown in FIG. 4, downlink traffic to three users are routed through the network. User1 and User2 are attached to Node5, and User3 is attached to Node4. Downlink traffic to User1 is routed through Node1, Node2 and Node4. Downlink traffic to User2 is routed through Node1, Node3 and Node4. Downlink traffic to User3 is routed through Node1 and Node3.

If Node4 experiences congestion (e.g., due to the link Node4→Node5 having a reduced capacity or blockage), Node4 may apply the back-pressure mechanism as mentioned above. That is, Node4 may limit the inbound data rate. Given that Node2 and Node3 are unaware of congestion at Node4, it is necessary to have some signaling from Node4 to Node2 and Node4 to Node3 regarding the buffer occupancy at Node4.

However, when Node4 starts to apply the back-pressure mechanism (i.e., Node2 and/or Node3 are made aware of buffer occupancy at Node4), Node1 may be still unaware of any congestion issues. More importantly, the donor node may continue to push data intended for User1 and User2 into the network. The buffers at Node2 and Node3 may eventually reach levels at which their back-pressure mechanisms are triggered. But between the time when the back-pressure mechanism is triggered at Node4 and the time when the donor node reduces its data rate for User1 and User2, a significant amount of data may have entered the network. As a result, due to the congestion at Node4, some or all of these packets are likely to be dropped.

Dropping of packets is highly undesirable, since it will lead to retransmissions, cause TCP congestion avoidance to kick in, etc. Thus, in the above example, in order to ensure that packets are not dropped, when Node4 starts the back-pressure mechanism, it has to ensure that it can accommodate the data that will continue to enter the network until the IAB donor starts its back-pressure mechanism. This implies that a level of buffer occupancy at which the back-pressure mechanism is triggered has to be adjusted based on the length of the routes and the number of UEs.

Figure 5:
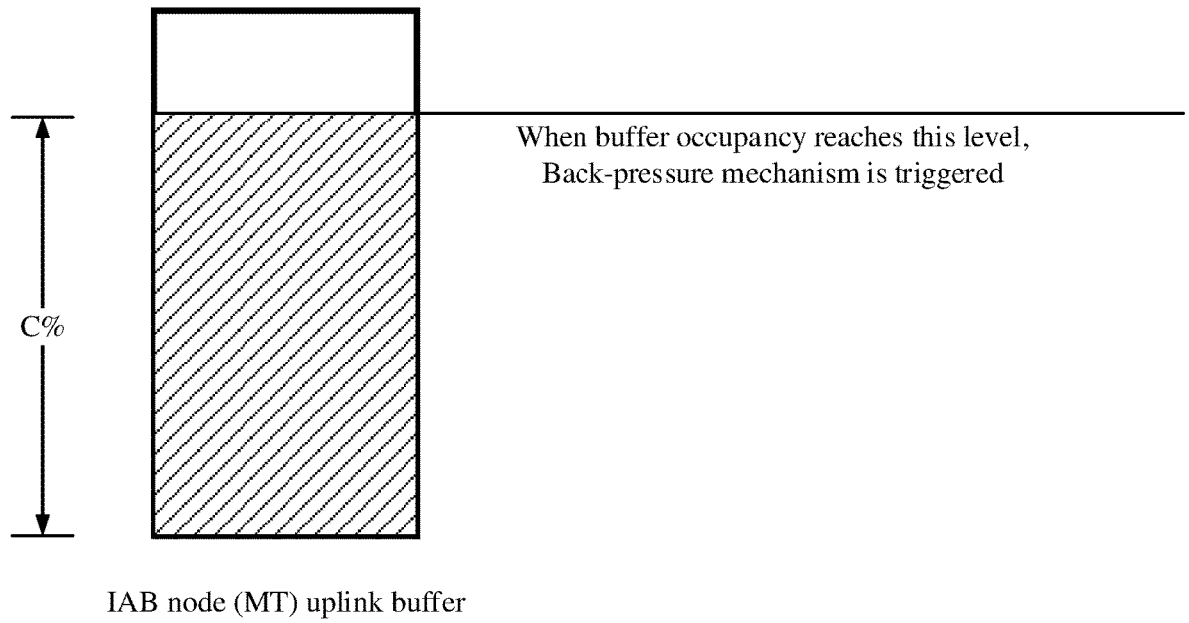
FIG. 5 illustrates an example buffer occupancy at an IAB node according to the back-pressure mechanism for congestion handling.

FIG. 5 illustrates an example buffer occupancy at an IAB node according to the back-pressure mechanism for congestion handling. As shown in FIG. 5, the level of buffer occupancy at which the back-pressure mechanism is triggered may be denoted by the parameter C. As described above, using the back-pressure mechanism, the level of buffer occupancy at which the back-pressure mechanism is triggered has to be adjusted based on the length of the routes and the number of UEs so as to avoid dropping of packets. This may lead to smaller values of C as routes increase in length and number of UEs increase, causing a significant under-utilization of the buffers.

Therefore, it is desirable to have a robust flow control to avoid a long-term congestion on a link and thus avoid or reduce dropping of packets.

According to the embodiments of the present disclosure, a mechanism that reacts faster to congestion on a route is proposed. In general, the mechanism includes transmitting a congestion indication from an IAB node experiencing congestion to the donor node in the case of downlink congestion or to a serving IAB node of a UE in the case of uplink congestion. The congestion indication provides congestion related information at the node experiencing congestion to enable the donor node or the serving IAB node (or an intermediate node along the route) to take appropriate actions. In particular, the information carried in the congestion indication may enable the donor node or the serving IAB node (or an intermediate node along the route) to determine which data packets to stop or slow down transmitting.

In other words, the proposed mechanism may enable parent nodes to take buffer limitations at descendant nodes into account when transmitting downstream data, and descendant nodes to take buffer limitations along the route when performing uplink resource allocation. The quicker reaction to congestion may result in less data to be injected into the network when congestion conditions have been observed.

For sake of clarity, the flow control for downlink congestion handling and the flow control for uplink congestion handling according to embodiments of the present disclosure will be described below separately.

Figure 6:
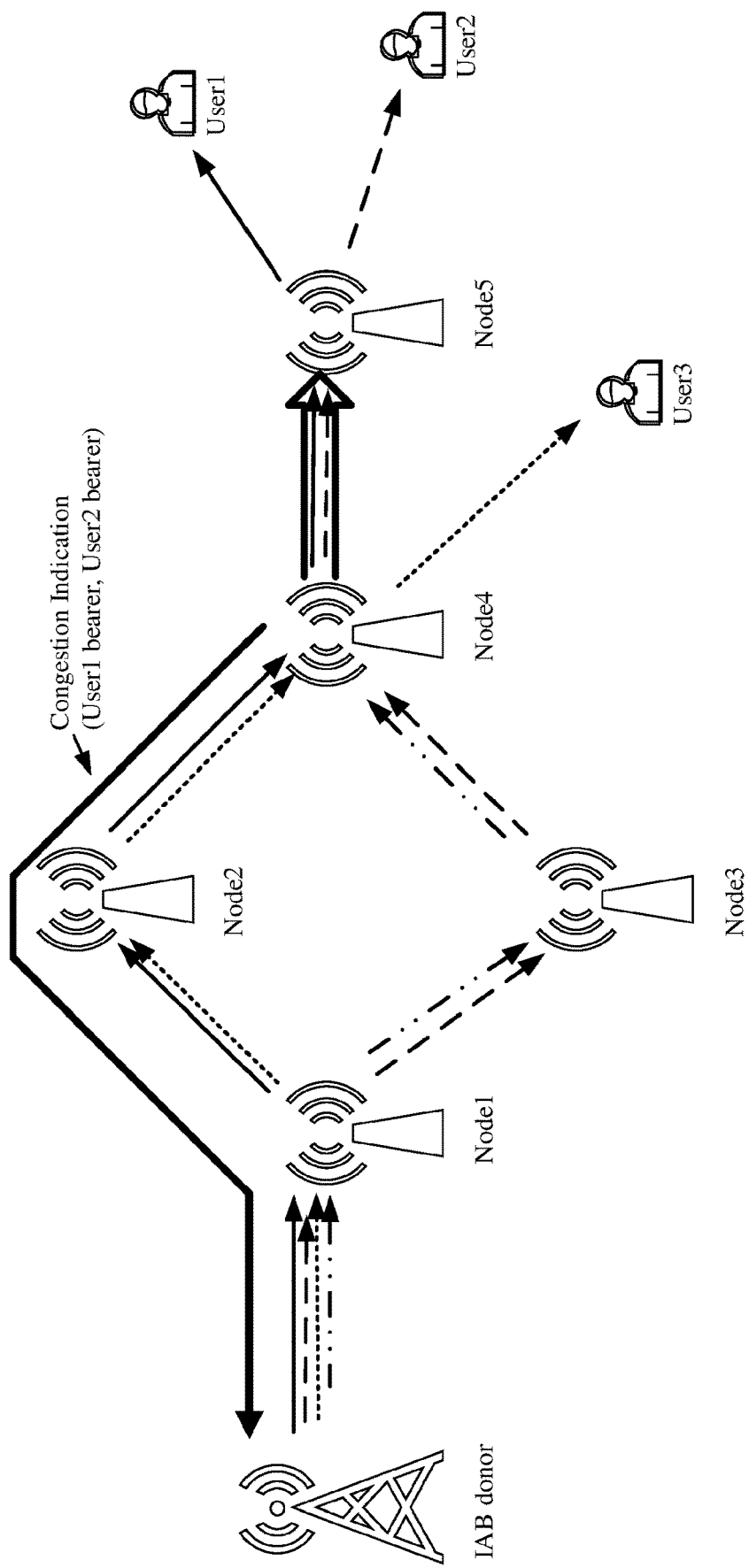
FIG. 6 schematically illustrates a mechanism for downlink congestion handling in an example IAB network in accordance with various embodiments of the present disclosure.

FIG. 6 illustrates a mechanism for downlink congestion handling in an example IAB network in accordance with various embodiments of the present disclosure. The flow control for downlink congestion handling will be described with reference to the exemplary downlink transmission scenario in FIG. 6.

In order to handle downlink congestion at an IAB node, a downlink congestion indication may be transmitted by the IAB node experiencing congestion to the IAB donor. The downlink congestion indication may include additional information that enables the IAB donor to take action mitigating congestion. The cause of the congestion may be that one or more outbound links from the IAB node have lowered capacity. It may be preferable to throttle only data traversing the links with lowered capacity, rather than throttling all data going through the congested IAB node. For example, the downlink congestion indication may identify a UE or a UE bearer or a backhaul RLC channel that is affected by the downlink congestion at the congested IAB node.

As shown in FIG. 6, for example, it is assumed that Node4 is experiencing downlink congestion because the link Node4→Node5 has a reduced capacity. In this situation, Node 4 may inform the IAB donor of the congestion at Node4 by transmitting a downlink congestion indication directly to the IAB donor. The downlink congestion indication may include identifications of one or more UE bearers (e.g. UE bearers for User1 and User2) that are affected by the downlink congestion at Node4.

According to an embodiment of the present disclosure, the downlink congestion indication may be transmitted to the IAB donor using an end-to-end communication protocol between the IAB node (generally referred to as "relay node" hereinafter) and the IAB donor (generally referred to as "donor node" hereinafter). For example, the end-to-end communication protocol may be based on an F1 interface protocol. The F1 interface protocol may be modified to be used for the IAB network between an IAB node (or an IAB donor DU) and an IAB donor CU, and sever as the control and user planes for the connection between the IAB node and the IAB donor.

Figure 7A:
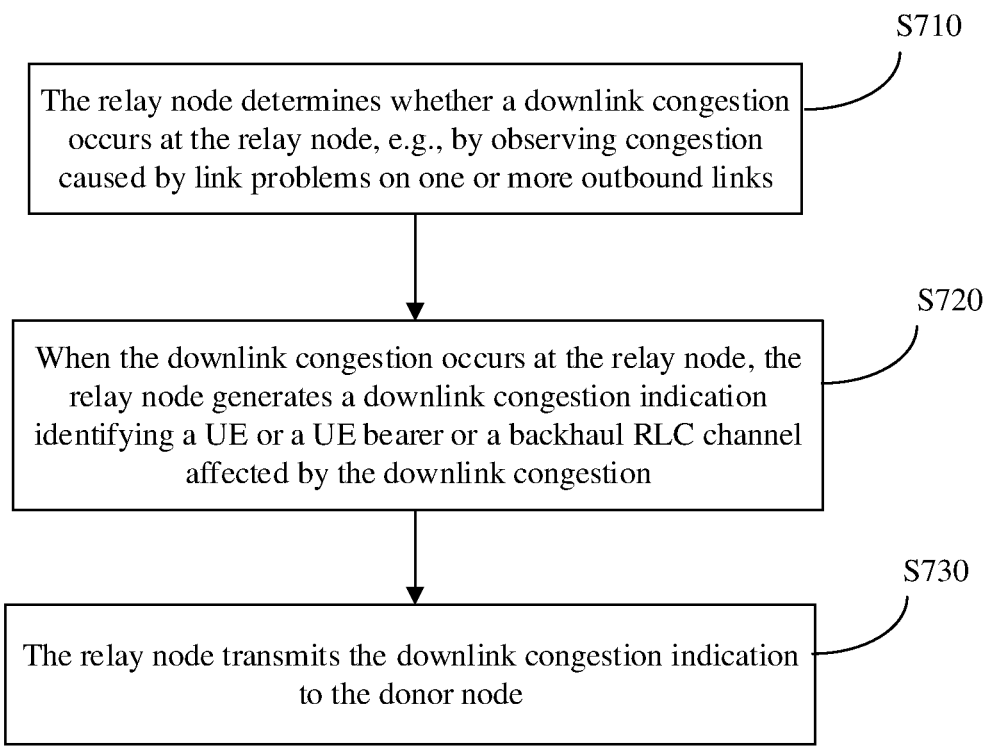
FIG. 7A illustrates an exemplary flow control for downlink congestion handling at a relay node in accordance with various embodiments of the present disclosure.
Figure 7B:
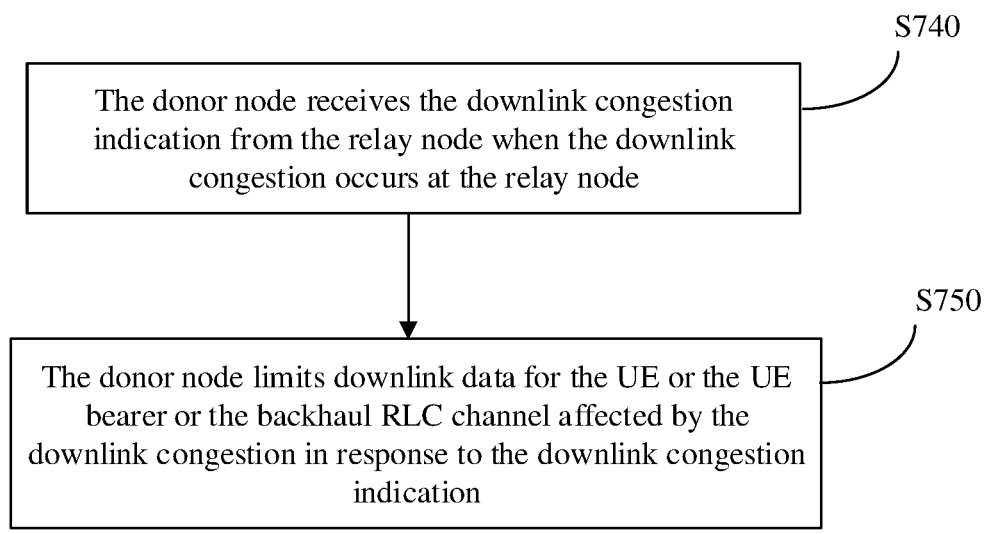
FIG. 7B illustrates an exemplary flow control for downlink congestion handling at a donor node in accordance with various embodiments of the present disclosure FIG. 8 schematically illustrates a mechanism for downlink congestion handling by transmitting a downlink congestion indication at adaptation layer in an example IAB network, in accordance with various embodiments of the present disclosure.

FIG. 7A illustrates an exemplary flow control for downlink congestion handling at a relay node in accordance with various embodiments of the present disclosure, and accordingly FIG. 7B illustrates an exemplary flow control for downlink congestion handling at a donor node in accordance with various embodiments of the present disclosure. The flow control for downlink congestion handling may be performed between the relay node and the donor node and include steps S710 to S730 in FIG. 7A and steps S740 to S750 in FIG. 7B.

At S710, the relay node may determine whether a downlink congestion occurs at the relay node, e.g., by observing congestion caused by link problems on one or more outbound links.

At S720, when it is determined that the downlink congestion occurs at the relay node, the relay node may generate a downlink congestion indication identifying a UE or a UE bearer or a backhaul Radio Link Control (RLC) channel that is affected by the downlink congestion.

In addition, the downlink congestion indication may include additional information that facilitates the donor node to take action mitigating congestion. For example, the downlink congestion indication may further include current buffer status information at the relay node, information about Protocol Data Unit (PDU) segments to be discarded due to the downlink congestion, and an inbound data rate or an outbound capacity (e.g. averaged over a predefined duration) at the relay node.

At S730, the relay node may transmit the downlink congestion indication to the donor node (e.g. the CU of the donor node). For example, the downlink congestion indication may be transmitted via an end-to-end communication protocol between the relay node and the donor node (e.g., via a modified F1 interface protocol).

In an example, the downlink congestion indication may be carried in a Downlink Data Delivery Status (DDDS) message shown in Table 1 as defined in 3GPP TS 38.425 V15.2.0 (June 2018). A cause value may be defined to indicate the downlink congestion at the relay node. Additionally, information such as UE bearers affected, current buffer status information, inbound data rate and outbound capacity at the relay node can be included in the modified DDDS message. Moreover, it should be understood that any other F1-U frames can be used to carry the downlink congestion indication, which is not limited herein.

TABLE 1

DL DATA DELIVERY STATUS (PDU Type 1) Format

| Bits | | | | | Number of Octets |
|---|---|---|---|---|---|
| 7  6  5  4 | 3 | 2 | 1 | 0 | |
| PDU Type (=1) | Highest Transmitted NR PDCP SN Ind | Highest Delivered NR PDCP SN Ind | Final Frame Ind. | Lost Packet Report | 1 |
| Spare | Data rate Ind. | Highest Retransmitted NR PDCP SN Ind | Highest Delivered Retransmitted NR PDCP SN Ind | Cause Report | 1 |
| Desired buffer size for the data radio bearer | | | | | 4 |
| Desired Data Rate | | | | | 0 or 4 |
| Number of lost NR-U Sequence Number ranges reported | | | | | 0 or 1 |
| Start of lost NR-U Sequence Number range | | | | | 0 or (6* Number of reported lost NR-U SN ranges) |
| End of lost NR-U Sequence Number range | | | | | |
| Highest successfully delivered NR PDCP Sequence Number | | | | | 0 or 3 |
| Highest transmitted NR PDCP Sequence Number | | | | | 0 or 3 |
| Cause Value | | | | | 0 or 1 |
| Highest successfully delivered retransmitted NR PDCP Sequence Number | | | | | 0 or 3 |
| Highest retransmitted NR PDCP Sequence Number | | | | | 0 or 3 |
| Padding | | | | | 0-3 |

At S740, the donor node may receive the downlink congestion indication from the relay node when the downlink congestion occurs at the relay node. As mentioned above, the downlink congestion indication identifies a UE or a UE bearer or a backhaul Radio Link Control (RLC) channel that is affected by the downlink congestion.

At S750, the donor node may limit downlink data for the UE or the UE bearer or the backhaul RLC channel affected by the downlink congestion in response to the downlink congestion indication.

For example, the donor node may limit the downlink data for the UE or the UE bearer or the backhaul RLC channel identified in the downlink congestion indication by reducing a downlink data rate for the UE or the UE bearer or the backhaul RLC channel.

Alternatively, the donor node may limit the downlink data for the UE or the UE bearer or the backhaul RLC channel identified in the downlink congestion indication by temporarily altering prioritization such that a priority assigned to the UE or the UE bearer or the backhaul RLC channel identified in the downlink congestion indication is a low priority.

According to the flow control as shown in FIG. 7A and FIG. 7B, the downlink congestion indication is transmitted directly from the relay node to the donor node via a modified F1 interface protocol. In addition to the F1 interface protocol, the downlink congestion indication may also be transmitted using a hop-by-hop communication protocol between the relay node and the donor node. Also, in addition to the donor node, the relay node may transmit the downlink congestion indication to its upstream nodes, so as to enable the upstream nodes to react on the downlink congestion indication similarly to the donor node. In this way, the upstream nodes may also contribute to the congestion handling.

Figure 8:
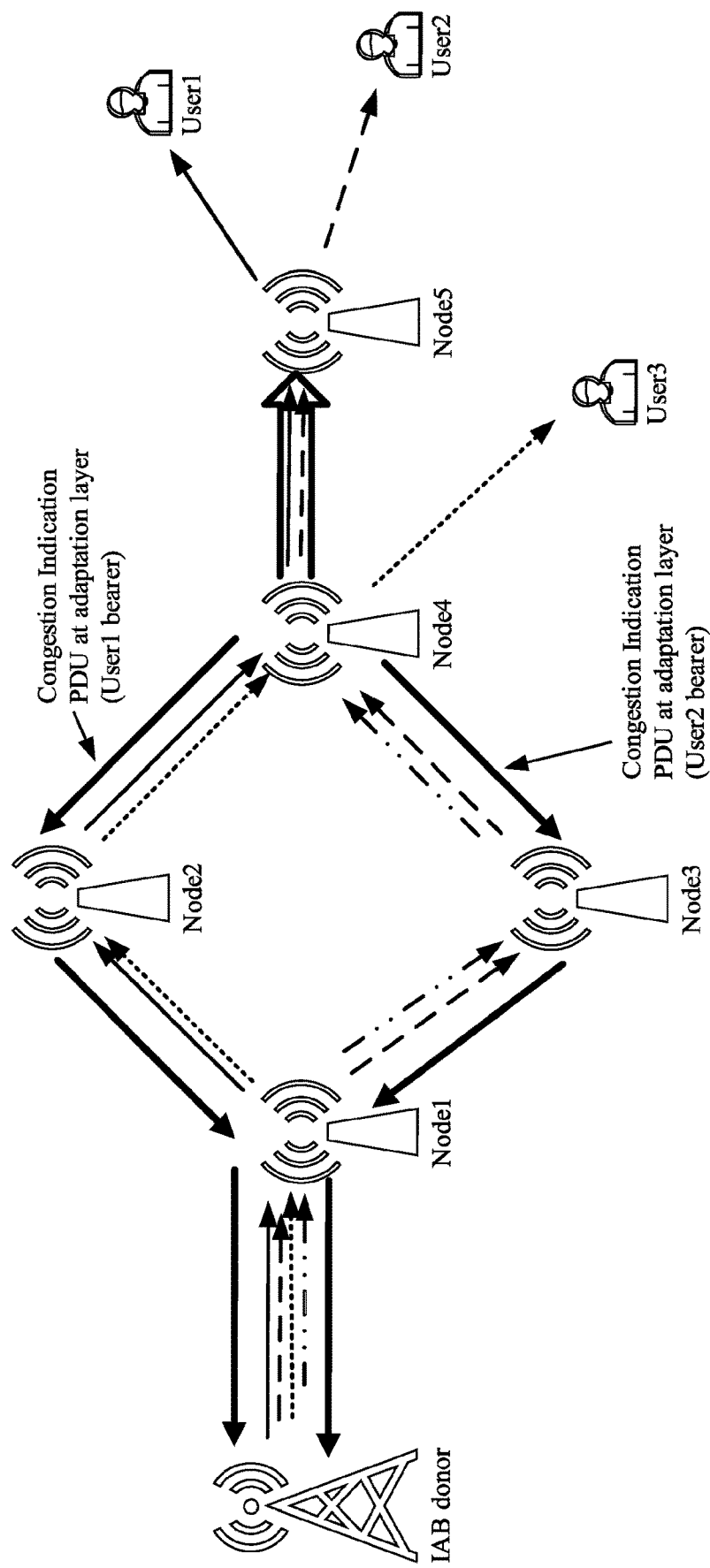

FIG. 8 schematically illustrates a mechanism for downlink congestion handling by transmitting a downlink congestion indication at adaptation layer in an example IAB network, in accordance with various embodiments of the present disclosure. In the embodiments, the downlink congestion indication is transmitted in accordance with an adaptation layer protocol which is also referred to as a backhaul adaptation protocol.

As shown in FIG. 8, for example, it is assumed that Node4 is experiencing downlink congestion because the link Node4→Node5 has a reduced capacity. In this situation, Node 4 may generate an adaptation layer PDU to carry the downlink congestion indication and transmit the adaptation layer PDU to its upstream nodes and the donor node according to adaptation layer routing rules. For example, Node4 may generate an adaptation layer PDU to carry the downlink congestion indication identifying that the UE bearer for User1 is affected by the downlink congestion, and transmit the adaptation layer PDU to the upstream nodes (Node2 and Node1) and then to the IAB donor. Meanwhile, Node4 may generate an adaptation layer PDU to carry the downlink congestion indication identifying that the UE bearer for User2 is affected by the downlink congestion, and transmit the adaptation layer PDU to the upstream nodes (Node3 and Node1) and then to the IAB donor.

In accordance with the adaptation layer protocol, an adaptation layer header may be defined to include one or more of the following identifiers: UE bearer specific ID, UE specific ID, Route ID, IAB node or IAB donor address. So the adaptation layer PDU carrying the downlink congestion indication may include a UE bearer specific ID or a UE specific ID or a backhaul RLC channel specific ID, depending on design of the adaptation layer header. The downlink congestion indication is then transmitted upstream and routed according to the adaptation layer mapping of UE bearer specific IDs to RLC backhaul channels. The above description assumes that a UE bearer is bi-directional (i.e., a UE bearer specific ID identifies a unique downstream and upstream data flow pair). If uni-directional bearers are used, each IAB node needs to know a corresponding uplink bearer for each downlink bearer.

As mentioned above, when a relay node is experiencing downlink congestion, the relay node may transmit a downlink congestion link to both the donor node and upstream nodes of the relay node in accordance with the adaptation layer protocol. Then both the donor node and the upstream nodes can act on the downlink congestion indication.

For example, the upstream nodes can limit data for the UE or the UE bearer or the backhaul RLC channel identified in the downlink congestion indication by dropping or delaying RLC segments corresponding to the UE or the UE bearer or the backhaul RLC channel. The donor node may limit the downlink data for the UE or the UE bearer or the backhaul RLC channel identified in the downlink congestion indication by reducing a downlink data rate for the UE or the UE bearer or the backhaul RLC channel. Alternatively, both the donor node and the upstream nodes may limit the downlink data for the UE or the UE bearer or the backhaul RLC channel identified in the downlink congestion indication by temporarily altering prioritization such that a priority assigned to the UE or the UE bearer or the backhaul RLC channel identified in the downlink congestion indication is a low priority.

It is noted that the relay node experiencing a downlink congestion (e.g., referred to as "first downlink congestion") may transmit a downlink congestion indication (e.g., referred to as "first downlink congestion indication") to the donor node and the upstream nodes, and meanwhile may possibly receive a downlink congestion indication (e.g., referred to as "second downlink congestion indication") from a downstream node of the relay node when the downstream node is also experiencing a downlink congestion (e.g., referred to as "first downlink congestion"). In this situation, given the downlink congestion indication received from the downstream node, the relay node (e.g., as an upstream node) can limit the downlink data toward the downstream node as described above.

Figure 9A:
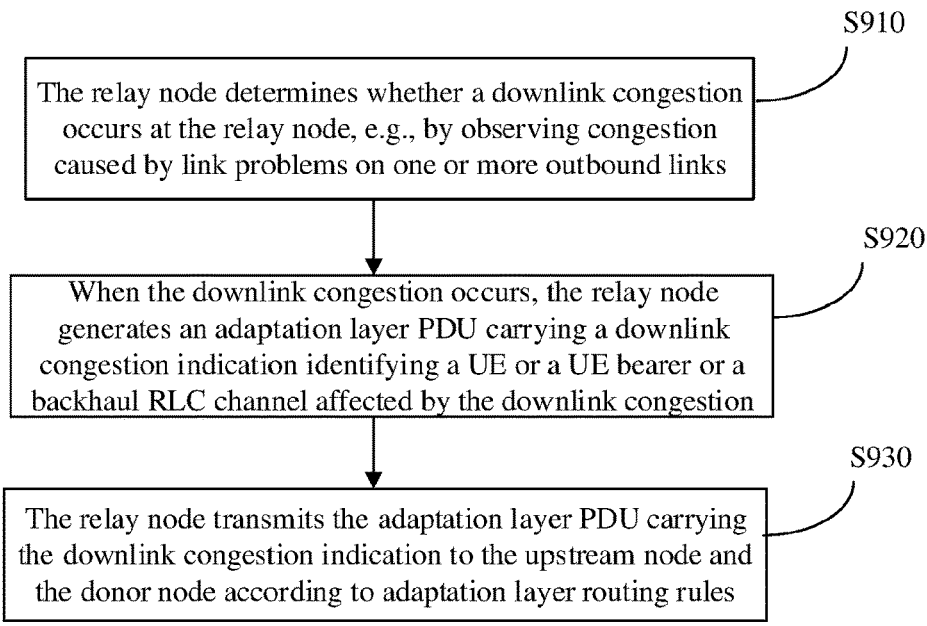
FIG. 9A illustrates an exemplary flow control for downlink congestion handling at a relay node in accordance with various embodiments of the present disclosure.
Figure 9B:
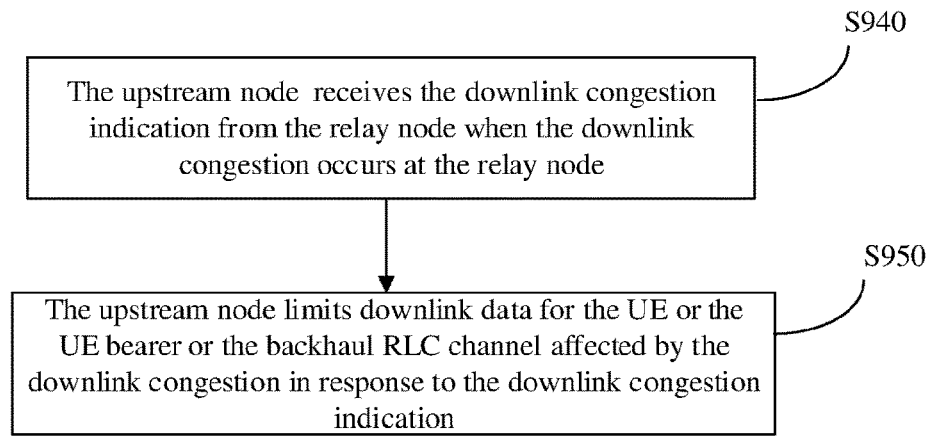
FIG. 9B illustrates an exemplary flow control for downlink congestion handling at an upstream node of the relay node in accordance with various embodiments of the present disclosure.
Figure 9C:
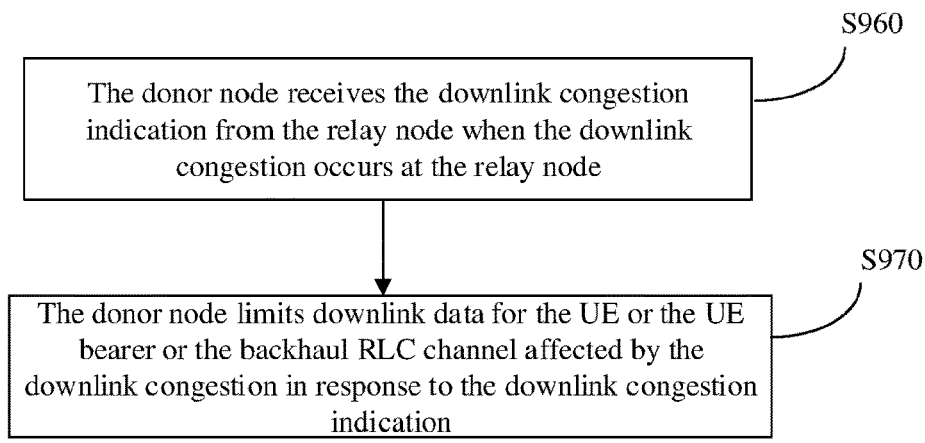
FIG. 9C illustrates an exemplary flow control for downlink congestion handling at a donor node in accordance with various embodiments of the present disclosure.

FIG. 9A illustrates an exemplary flow control for downlink congestion handling at a relay node in accordance with various embodiments of the present disclosure, and accordingly FIG. 9B illustrates an exemplary flow control for downlink congestion handling at an upstream node of the relay node in accordance with various embodiments of the present disclosure and FIG. 9C illustrates an exemplary flow control for downlink congestion handling at a donor node in accordance with various embodiments of the present disclosure. The flow control for downlink congestion handling may be performed among the relay node, the upstream node of the relay node and the donor node, and may include steps S910 to S930 in FIG. 9A, steps S940 to S950 in FIG. 9B, and steps S960 to S970 in FIG. 9C.

At S910, the relay node may determine whether a downlink congestion occurs at the relay node, e.g., by observing congestion caused by link problems on one or more outbound links.

At S920, when it is determined that the downlink congestion occurs at the relay node, the relay node may generate an adaptation layer PDU to carry a downlink congestion indication identifying a UE or a UE bearer or a backhaul Radio Link Control (RLC) channel that is affected by the downlink congestion.

At S930, the relay node may transmit the adaptation layer PDU carrying the downlink congestion indication to the upstream node and the donor node according to adaptation layer routing rules.

For example, as shown in FIG. 8, the congested Node4 may generate an adaptation layer PDU to carry a downlink congestion indication identifying that the UE bearer for User1 is affected by the downlink congestion at S920, and transmit the adaptation layer PDU to the upstream nodes (Node2 and Node1) and then to the IAB donor at S930. Also, the congested Node4 may generate an adaptation layer PDU to carry the downlink congestion indication identifying that the UE bearer for User2 is affected by the downlink congestion at S920, and transmit the adaptation layer PDU to the upstream nodes (Node3 and Node1) and then to the IAB donor at S930.

At S940, the upstream node of the relay node may receive the downlink congestion indication from the relay node when the downlink congestion occurs at the relay node.

At S950, the upstream node of the relay node may limit downlink data for the UE or the UE bearer or the backhaul RLC channel affected by the downlink congestion in response to the downlink congestion indication, e.g., by allocating few resources to one or more upstream nodes, by dropping or delaying RLC segments or by temporarily altering prioritization as described above.

At S960, the donor node may receive the downlink congestion indication from the relay node when the downlink congestion occurs at the relay node.

At S970, the donor node may limit downlink data for the UE or the UE bearer or the backhaul RLC channel affected by the downlink congestion in response to the downlink congestion indication.

According to some embodiments of the present disclosure, the downlink congestion indication may also be generated in accordance with a RLC layer protocol and routed at the RLC layer to the upstream node and the donor node. But appropriate routing at the adaptation layer is also needed. In other words, the downlink congestion indication in accordance with the RLC layer protocol is transmitted from the relay node to the upstream node and the donor node according to RLC layer and adaptation layer routing rules. In this case, it is required that the adaptation layer is placed below the RLC layer in the protocol architecture.

Figure 10:
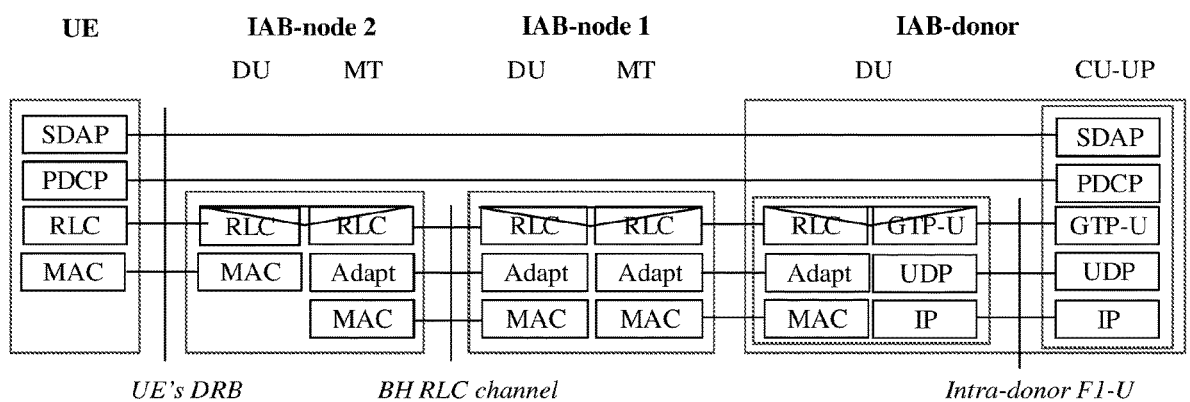
FIG. 10 illustrates an example protocol architecture of an IAB network in accordance with various embodiments of the present disclosure.

FIG. 10 illustrates an example protocol architecture of an IAB network in accordance with various embodiments of the present disclosure. In such a protocol architecture, the relay node experiencing downlink congestion may be allowed to generate a RLC layer PDU to carry a downlink congestion indication and transmit the RLC layer PDU to the upstream node and the donor node according to RLC layer and adaptation layer routing rules. Accordingly, the upstream node and the donor node may act on the downlink congestion indication to perform flow control for downlink congestion handling as described above.

Figure 11:
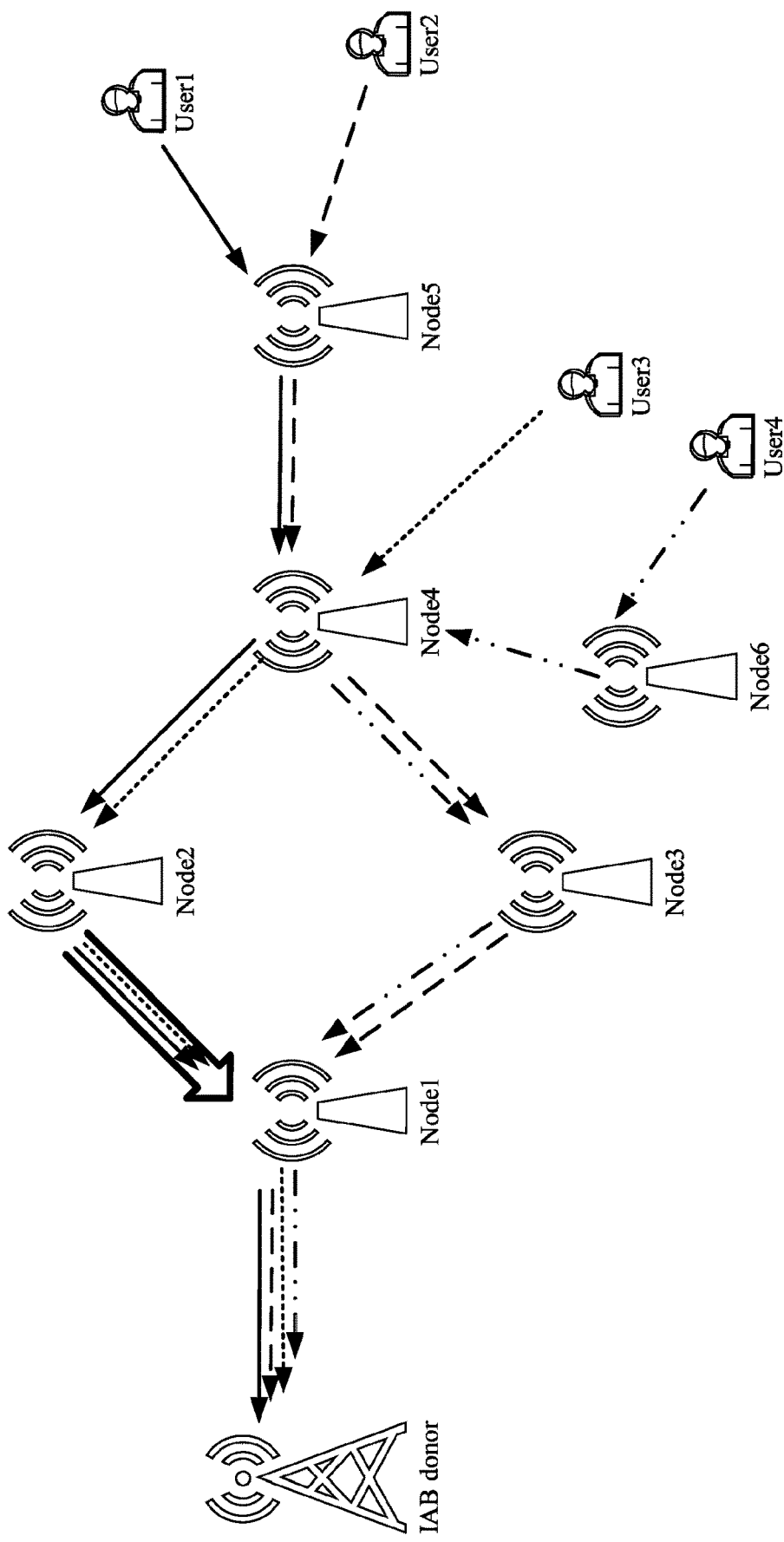
FIG. 11 schematically illustrates an uplink transmission scenario in an example IAB network with six IAB nodes.

Similar to the above described flow control for downlink congestion handling, it is also proposed to perform uplink congestion handling. FIG. 11 schematically illustrates an uplink transmission scenario in an example IAB network with six IAB nodes. The description about the flow control for uplink congestion handling will be provided below with reference to the example IAB network as shown.

As shown in FIG. 11, uplink traffic from four users are routed through the network. User1 and User2 are attached to Node5, User3 is attached to Node4 and User4 is attached to Node6. A serving node is defined as a node configured to provide an interface to a UE and a backhaul link to a relay node in the network. Accordingly, Node5 is the serving node for User1 and User2, Node4 is the serving node for User3 and Node6 is the serving node for User4. Uplink traffic from User1 is routed through Node4, Node2 and Node1. Uplink traffic from User2 is routed through Node4, Node3 and Node1. Uplink traffic from User3 is routed through Node2 and Node1. Uplink traffic from User4 is routed through Node4, Node3 and Node1.

For example, if Node2 experiences an uplink congestion (e.g., due to the link Node2→Node1 having a reduced capacity or blockage), Node2 may generate an uplink congestion indication and send the uplink congestion indication to one or more serving nodes and downstream nodes that are affected by the uplink congestion at Node2, so as to enable the one or more serving nodes and downstream nodes to take appropriate actions to avoid or reduce dropping of packets.

Figure 12:
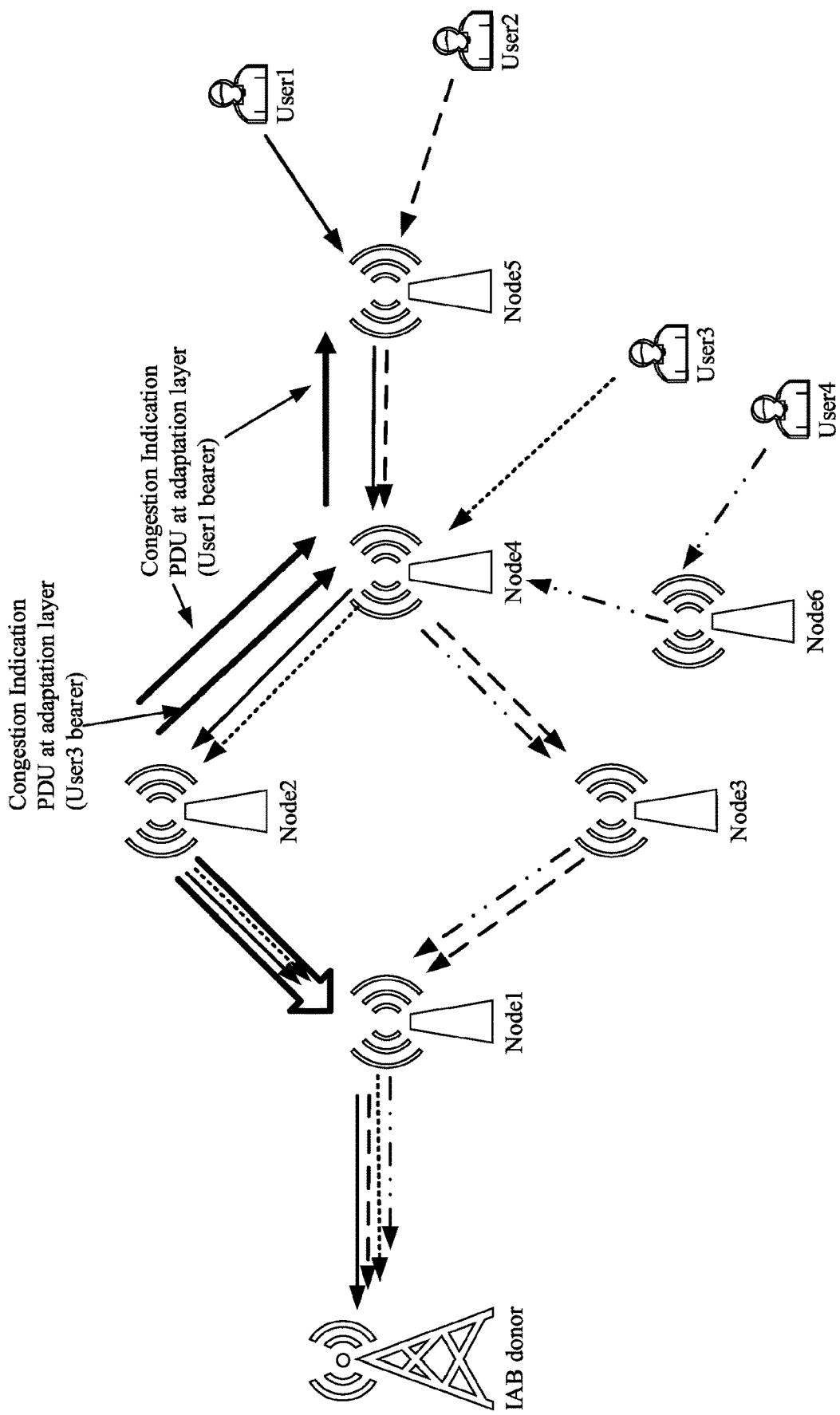
FIG. 12 schematically illustrates a mechanism for uplink congestion handling in accordance with various embodiments of the present disclosure.

The flow control for uplink congestion handling will be described in detail with reference to FIG. 12, which schematically illustrates a mechanism for uplink congestion handling in accordance with various embodiments of the present disclosure. As shown in FIG. 12, it is assumed that Node2 is experiencing uplink congestion because the link Node2→Node1 has a reduced capacity. In this situation, Node 2 may generate an adaptation layer PDU to carry the uplink congestion indication and transmit the adaptation layer PDU to one or more downstream nodes and serving nodes according to adaptation layer routing rules.

For example, Node2 may generate an adaptation layer PDU to carry the uplink congestion indication identifying that the UE bearer for User1 is affected by the uplink congestion, and transmit the adaptation layer PDU to the downstream node (Node4) and the serving node (Node5) for User1. Meanwhile, Node2 may generate an adaptation layer PDU to carry the uplink congestion indication identifying that the UE bearer for User3 is affected by the uplink congestion, and transmit the adaptation layer PDU to the serving node (Node4) for User3.

Similar to the adaptation layer PDU carrying the downlink congestion indication, the adaptation layer PDU carrying the uplink congestion indication may also include a UE bearer specific ID or a UE specific ID or a backhaul RLC channel specific ID, depending on design of the adaptation layer header. The uplink congestion indication is then transmitted downstream and routed according to the adaptation layer mapping of UE bearer specific IDs to RLC backhaul channels. It is assumed that a UE bearer is bi-directional (i.e., a UE bearer specific ID identifies a unique downstream and upstream data flow pair). If uni-directional bearers are used, each IAB node needs to know a corresponding uplink bearer for each downlink bearer.

Figure 13A:
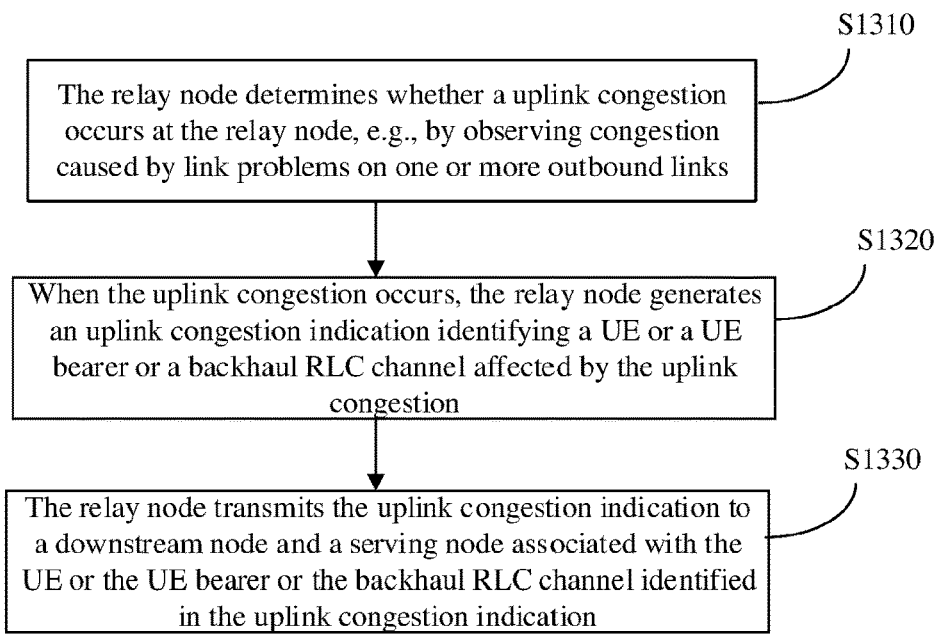
FIG. 13A illustrates an exemplary flow control for uplink congestion handling at a relay node in accordance with various embodiments of the present disclosure.
Figure 13B:
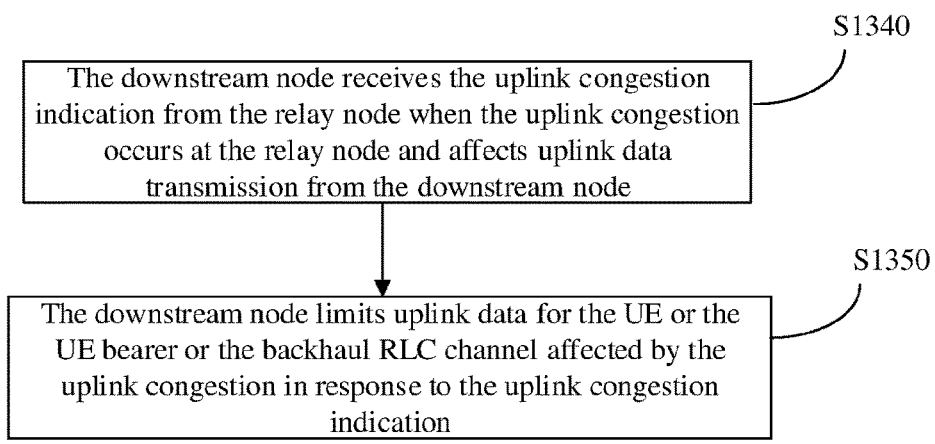
FIG. 13B illustrates an exemplary flow control for uplink congestion handling at a downstream node of the relay node in accordance with various embodiments of the present disclosure.
Figure 13C:
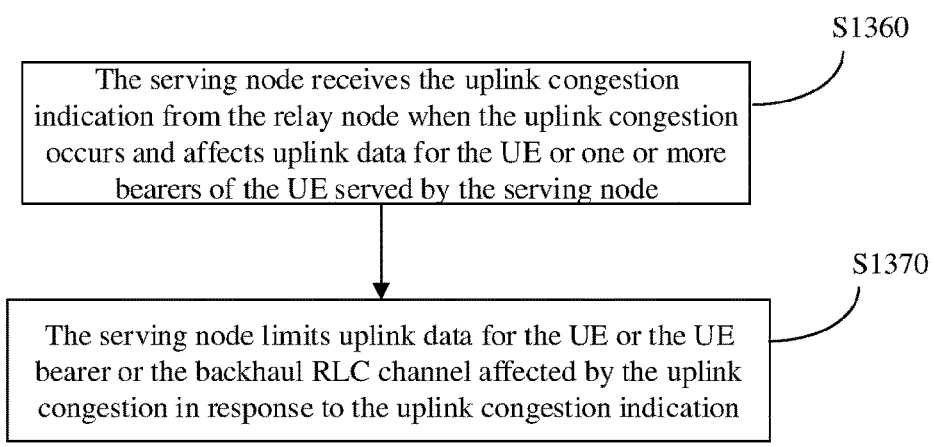
FIG. 13C illustrates an exemplary flow control for uplink congestion handling at a serving node in accordance with various embodiments of the present disclosure.

FIG. 13A illustrates an exemplary flow control for uplink congestion handling at a relay node in accordance with various embodiments of the present disclosure, and accordingly FIG. 13B illustrates an exemplary flow control for uplink congestion handling at a downstream node of the relay node in accordance with various embodiments of the present disclosure and FIG. 13C illustrates an exemplary flow control for uplink congestion handling at a serving node in accordance with various embodiments of the present disclosure. The flow control for uplink congestion handling may be performed among the relay node, the downstream node of the relay node and the serving node, and may include steps S1310 to S1330 in FIG. 13A, steps S1340 to S1350 in FIG. 13B, and steps S1360 to S1370 in FIG. 13C.

At S1310, the relay node may determine whether an uplink congestion occurs at the relay node, e.g., by observing congestion caused by link problems on one or more outbound links.

At S1320, when it is determined that the uplink congestion occurs at the relay node, the relay node may generate an uplink congestion indication identifying a UE or a UE bearer or a backhaul Radio Link Control (RLC) channel that is affected by the uplink congestion.

For example, the uplink congestion indication may be carried in an adaptation layer PDU for transmission according to adaptation layer routing rules. Also, the uplink congestion indication may be carried in a Radio Link Control (RLC) layer Protocol Data Unit (PDU) for transmission according to RLC layer and adaptation layer routing rules.

In addition, similar to the downlink congestion indication, the uplink congestion indication may further include current buffer status information at the relay node, information about Protocol Data Unit (PDU) segments to be discarded due to the uplink congestion, an inbound data rate or an outbound capacity at the relay node.

At S1330, the relay node may transmit the uplink congestion indication to a downstream node and a serving node associated with the UE or the UE bearer or the backhaul RLC channel identified in the uplink congestion indication.

For example, as shown in FIG. 12, the congested Node2 may generate an adaptation layer PDU to carry an uplink congestion indication identifying that the UE bearer for User1 is affected by the uplink congestion at S1320, and transmit the adaptation layer PDU to the downstream node (Node4) and the serving node (Node5) for User1 at S1330. Also, the congested Node2 may generate an adaptation layer PDU to carry an uplink congestion indication identifying that the UE bearer for User3 is affected by the uplink congestion at S1320, and transmit the adaptation layer PDU to the serving node (Node4) for User3 at S1330. It is noted that there is no downstream node between the congested Node2 and the serving node (Node4) for User3, so the uplink congestion indication identifying that the UE bearer for User3 is affected by the uplink congestion may be only transmitted to the serving node for User3.

At S1340, the downstream node of the relay node may receive the uplink congestion indication from the relay node when the uplink congestion occurs at the relay node and affects uplink data transmission from the downstream node.

At S1350, the downstream node of the relay node may limit uplink data for the UE or the UE bearer or the backhaul RLC channel affected by the uplink congestion in response to the uplink congestion indication, e.g., by allocating fewer resources to one or more downstream nodes, by dropping or delaying RLC segments or by temporarily altering prioritization as described above.

At S1360, the serving node may receive the uplink congestion indication from the relay node when the uplink congestion occurs at the relay node and affects uplink data for the UE or one or more bearers of the UE served by the serving node.

At S1370, the serving node may limit uplink data for the UE or the UE bearer or the backhaul RLC channel affected by the uplink congestion in response to the uplink congestion indication.

In various embodiments of the present disclosure, the serving node may limit the uplink data for the UE or the one or more bearers of the UE or the backhaul RLC channel by allocating resources according to a buffer status report from the UE indicating buffered data for each bearer of the UE such that the one or more bearers are not able to be accommodated in PDUs transmitted by the UE. Also, the serving node may limit the uplink data for the UE or the one or more bearers of the UE or the backhaul RLC channel by discarding RLC PDUs corresponding to the one or more bearers of the UE. Alternatively, the serving node may limit the uplink data for the UE or the one or more bearers of the UE or the backhaul RLC channel by generating a message instructing the UE to reduce a data rate for the one or more bearers of the UE, and the UE can reduce the data rate for those bearers in response to receiving the message from the serving node.

Figure 14:
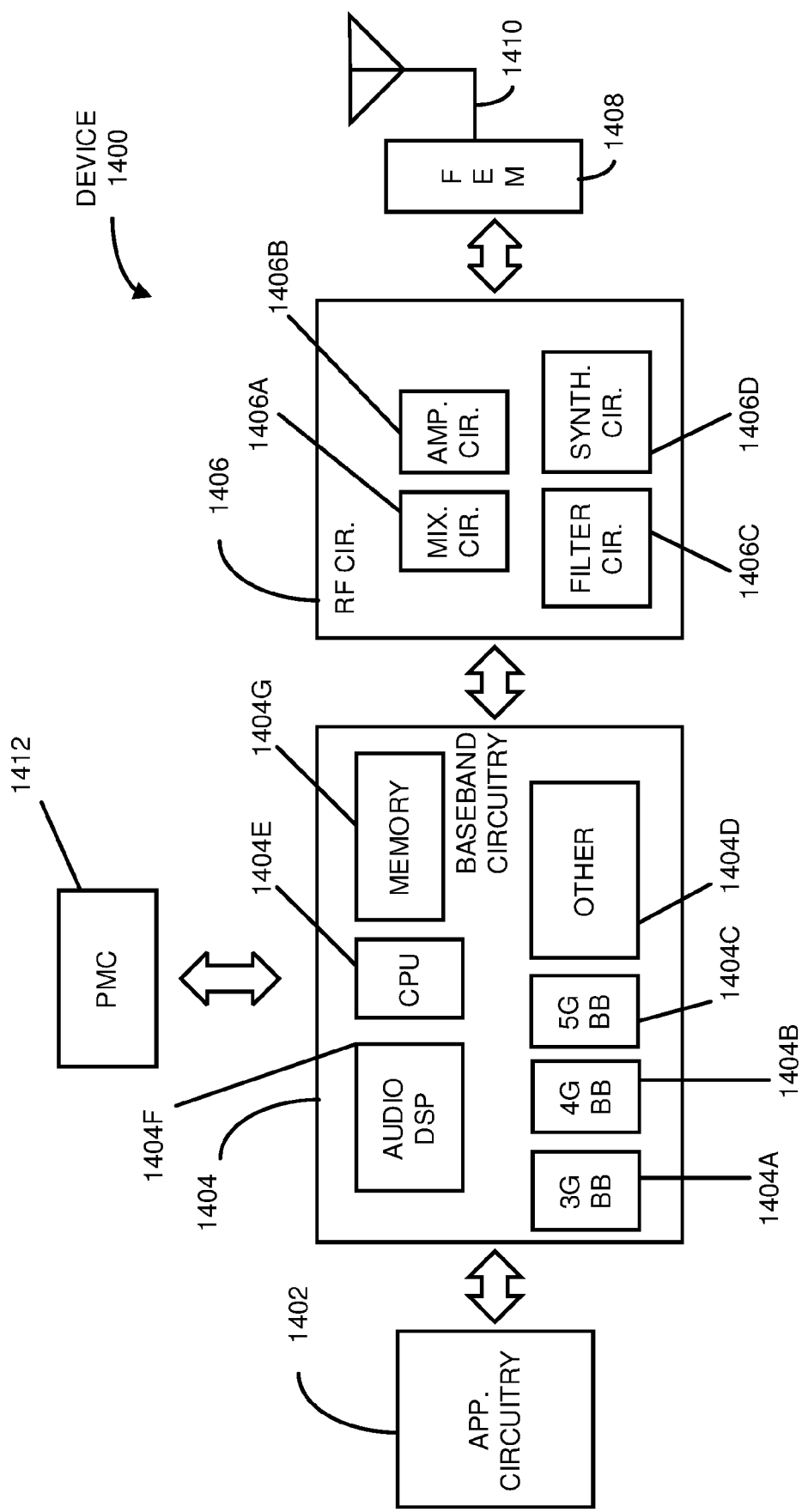
FIG. 14 illustrates example components of a device in accordance with some embodiments of the disclosure.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404A, a fourth generation (4G) baseband processor 1404B, a fifth generation (5G) baseband processor 1404C, or other baseband processor(s) 1404D for other existing generations, generations in development or to be developed in the future (e.g., second generation (2G), sixth generation (6G), etc.). The baseband circuitry 1404 (e.g., one or more of baseband processors 1404A-D) may handle various radio control functions that enable communication with one or more radio networks via the RF circuitry 1406. In other embodiments, some or all of the functionality of baseband processors 1404A-D may be included in modules stored in the memory 1404G and executed via a Central Processing Unit (CPU) 1404E. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404F. The audio DSP(s) 1404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406a of the receive signal path may include passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively.

In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer including a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM 1408, or in both the RF circuitry 1406 and the FEM 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM 1408.

In some embodiments, the PMC 1412 may control, or otherwise be part of, various power saving mechanisms of the device 1400. For example, if the device 1400 is in an RRC_Connected state, where it is still connected to the RAN node as it expects to receive traffic shortly, then it may enter a state known as Discontinuous Reception Mode (DRX)

after a period of inactivity. During this state, the device 1400 may power down for brief intervals of time and thus save power.

If there is no data traffic activity for an extended period of time, then the device 1400 may transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 15:
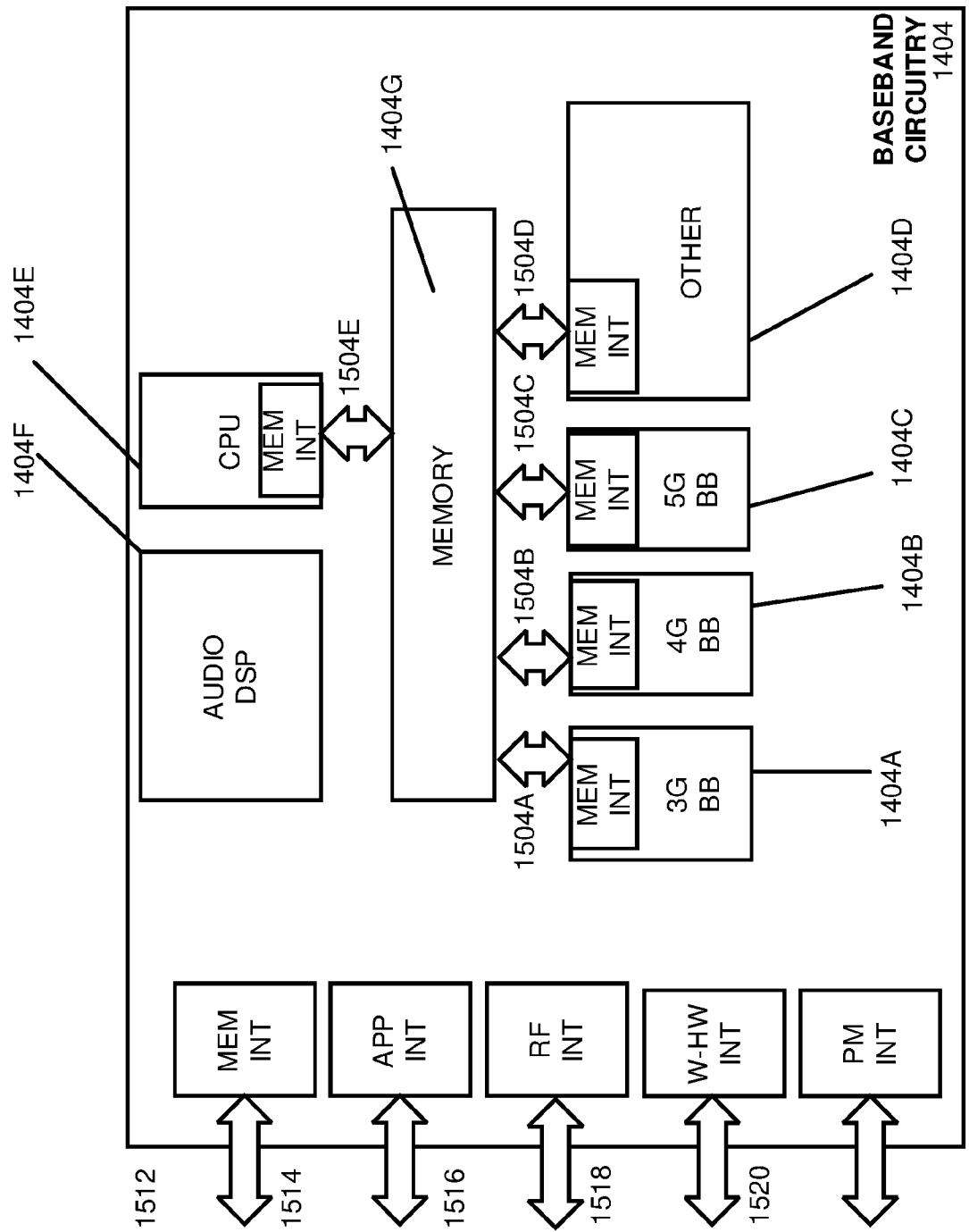
FIG. 15 illustrates example interfaces of baseband circuitry in accordance with some embodiments of the disclosure.

FIG. 15 illustrates example interfaces of baseband circuitry in accordance with some embodiments. As discussed above, the baseband circuitry 1404 of FIG. 14 may include processors 1404A-1404E and a memory 1404G utilized by said processors. Each of the processors 1404A-1404E may include a memory interface, 1504A-1504E, respectively, to send/receive data to/from the memory 1404G.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412).

Figure 16:
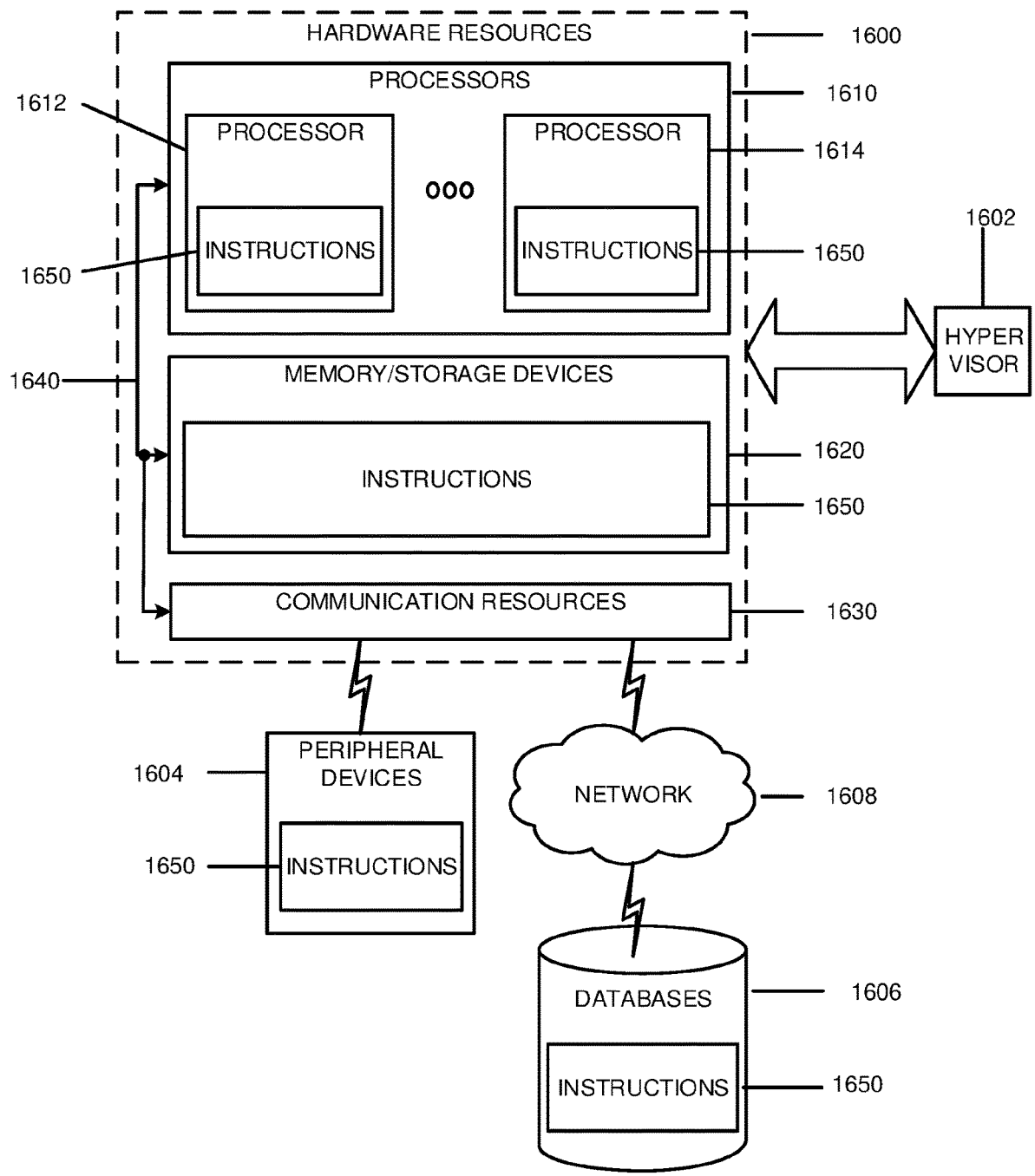
FIG. 16 is a block diagram illustrating components, according to some example embodiments of the disclosure, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1650 may include software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

The following paragraphs describe examples of various embodiments.

Example 1 includes an apparatus for a relay node in a Radio Access Network (RAN), the apparatus comprising: a radio frequency (RF) interface to receive and transmit downlink data for one or more User Equipments (UEs) or UE bearers; and processing circuitry coupled with the RF interface, wherein the processing circuitry is to: determine a downlink congestion occurs at the relay node; and generate a downlink congestion indication to identify a UE, a UE bearer, or a backhaul Radio Link Control (RLC) channel affected by the downlink congestion, and the RF interface is to transmit the downlink congestion indication to a donor node in the RAN.

Example 2 includes the apparatus of Example 1, wherein the downlink congestion indication is transmitted to the donor node using an end-to-end communication protocol between the relay node and the donor node.

Example 3 includes the apparatus of Example 2, wherein the end-to-end communication protocol is based on an F1 interface protocol.

Example 4 includes the apparatus of Example 1, wherein the RAN further comprises an upstream node of the relay node, the upstream node is associated with the UE, the UE bearer, or the backhaul RLC channel identified in the downlink congestion indication, and the downlink congestion indication is transmitted to the upstream node and the donor node using a hop-by-hop communication protocol between the relay node and the donor node.

Example 5 includes the apparatus of Example 4, wherein the processing circuitry is further to: generate an adaptation layer Protocol Data Unit (PDU) to carry the downlink congestion indication, and the RF interface is further to: transmit the adaptation layer PDU to the upstream node and the donor node according to adaptation layer routing rules.

Example 6 includes the apparatus of Example 4, wherein the processing circuitry is further to: generate a Radio Link Control (RLC) layer Protocol Data Unit (PDU) to carry the downlink congestion indication, and the RF interface is further to: transmit the RLC layer PDU to the upstream node and the donor node according to RLC layer and adaptation layer routing rules.

Example 7 includes the apparatus of any of Examples 1 to 6, wherein the downlink congestion indication further comprises current buffer status information at the relay node, information about Protocol Data Unit (PDU) segments to be discarded due to the downlink congestion, and an inbound data rate or an outbound capacity at the relay node.

Example 8 includes the apparatus of any of Examples 1 to 3, wherein the downlink congestion indication is carried in a Downlink Data Delivery Status (DDDS) message including a cause value to indicate the downlink congestion at the relay node.

Example 9 includes the apparatus of Example 1, wherein the RAN further comprises a downstream node of the relay node, the downlink congestion is a first downlink congestion and the downlink congestion indication is a first downlink congestion indication; the RF interface is further to receive a second downlink congestion indication from the downstream node when a second downlink congestion occurs at the downstream node and affects downlink data transmission from the relay node, wherein the second downlink congestion indication is to identify a UE, a UE bearer, or a backhaul RLC channel affected by the second downlink congestion; and the processing circuitry is further to limit downlink data for the UE, the UE bearer, or the backhaul RLC channel affected by the second downlink congestion based on the second downlink congestion indication.

Example 10 includes the apparatus of Example 9, wherein the processing circuitry is further to: limit downlink data for the UE, the UE bearer, or the backhaul RLC channel affected by the second downlink congestion based on the second downlink congestion indication by allocating fewer resources to one or more upstream nodes corresponding to the UE, the UE bearer, or the backhaul RLC channel identified in the second downlink congestion indication.

Example 11 includes the apparatus of Example 9, wherein the processing circuitry is further to: limit downlink data for the UE, the UE bearer, or the backhaul RLC channel affected by the second downlink congestion based on the second downlink congestion indication by dropping or delaying RLC segments corresponding to the UE, the UE bearer, or the backhaul RLC channel identified in the second downlink congestion indication.

Example 12 includes the apparatus of Example 9, wherein the processing circuitry is further to: temporarily alter prioritization based on the second downlink congestion indication such that a priority assigned to the UE, the UE bearer, or the backhaul RLC channel identified in the second downlink congestion indication is a low priority.

Example 13 includes the apparatus of any of Examples 1 to 12, wherein the relay node is an Integrated Access and Backhaul (IAB) node and the donor node is an IAB donor node.

Example 14 includes the apparatus of any of Examples 4 to 6, wherein the relay node and the upstream node are Integrated Access and Backhaul (IAB) nodes and the donor node is an IAB donor node.

Example 15 includes the apparatus of any of Examples 9 to 12, wherein the relay node and the downstream node are Integrated Access and Backhaul (IAB) nodes and the donor node is an IAB donor node.

Example 16 includes an apparatus for a donor node in a Radio Access Network (RAN), the apparatus comprising: a radio frequency (RF) interface to receive a downlink congestion indication from a relay node in the RAN when a downlink congestion occurs at the relay node, wherein the downlink congestion indication is to identify a User Equipment (UE), a UE bearer, or a backhaul Radio Link Control (RLC) channel affected by the downlink congestion; and processing circuitry coupled with the RF interface, wherein the processing circuitry is to: limit downlink data for the UE, the UE bearer, or the backhaul RLC channel affected by the downlink congestion based on the downlink congestion indication.

Example 17 includes the apparatus of Example 16, wherein the downlink congestion indication is transmitted from the relay node to the donor node using an end-to-end communication protocol between the relay node and the donor node.

Example 18 includes the apparatus of Example 17, wherein the end-to-end communication protocol is based on an F1 interface protocol.

Example 19 includes the apparatus of Example 16, wherein the downlink congestion indication is transmitted from the relay node to the donor node using a hop-by-hop communication protocol between the relay node and the donor node.

Example 20 includes the apparatus of Example 19, wherein the downlink congestion indication is carried in an adaptation layer Protocol Data Unit (PDU) and transmitted from the relay node to the donor node according to adaptation layer routing rules.

Example 21 includes the apparatus of Example 19, wherein the downlink congestion indication is carried in a Radio Link Control (RLC) layer Protocol Data Unit (PDU) and transmitted from the relay node to the donor node according to RLC layer and adaptation layer routing rules.

Example 22 includes the apparatus of any of Examples 16 to 21, wherein the downlink congestion indication further comprises current buffer status information at the relay node, information about Protocol Data Unit (PDU) segments to be discarded due to the downlink congestion, an inbound data rate or an outbound capacity at the relay node.

Example 23 includes the apparatus of any of Examples 16 to 18, wherein the downlink congestion indication is carried in a Downlink Data Delivery Status (DDDS) message including a cause value to indicate the downlink congestion at the relay node.

Example 24 includes the apparatus of Example 16, wherein the processing circuitry is to limit the downlink data for the UE, the UE bearer, or the backhaul RLC channel identified in the downlink congestion indication by reducing a downlink data rate for the UE, the UE bearer, or the backhaul RLC channel identified in the downlink congestion indication.

Example 25 includes the apparatus of Example 16, wherein the processing circuitry is to limit the downlink data for the UE, the UE bearer, or the backhaul RLC channel identified in the downlink congestion indication by temporarily altering prioritization such that a priority assigned to the UE, the UE bearer, or the backhaul RLC channel identified in the downlink congestion indication is a low priority.

Example 26 includes the apparatus of any of Examples 16 to 25, wherein the relay node is an Integrated Access and Backhaul (IAB) node and the donor node is an IAB donor node.

Example 27 includes an apparatus for a relay node in a Radio Access Network (RAN), the apparatus comprising: a radio frequency (RF) interface to receive and transmit uplink data for one or more User Equipments (UEs) or UE bearers; and processing circuitry coupled with the RF interface, wherein the processing circuitry is to: determine an uplink congestion occurs at the relay node; and generate an uplink congestion indication to identify a UE, a UE bearer, or a backhaul Radio Link Control (RLC) channel affected by the uplink congestion, and the RF interface is to transmit the uplink congestion indication to a serving node in the RAN that serves the UE, the UE bearer, or the backhaul RLC channel identified in the uplink congestion indication.

Example 28 includes the apparatus of Example 27, wherein the RAN further comprises a downstream node of the relay node, the downstream node is associated with the UE, the UE bearer, or the backhaul RLC channel identified in the uplink congestion indication, and the uplink congestion indication is transmitted to the downstream node and the serving node using a hop-by-hop communication protocol.

Example 29 includes the apparatus of Example 28, wherein the processing circuitry is further to: generate an adaptation layer Protocol Data Unit (PDU) to carry the uplink congestion indication, and the RF interface is further to: transmit the adaptation layer PDU to the downstream node and the serving node according to adaptation layer routing rules.

Example 30 includes the apparatus of Example 28, wherein the processing circuitry is further to: generate a Radio Link Control (RLC) layer Protocol Data Unit (PDU) to carry the uplink congestion indication, and the RF interface is further to: transmit the RLC layer PDU to the downstream node and the serving node according to RLC layer and adaptation layer routing rules.

Example 31 includes the apparatus of any of Examples 27 to 30, wherein the uplink congestion indication further comprises current buffer status information at the relay node, information about Protocol Data Unit (PDU) segments to be discarded due to the uplink congestion, an inbound data rate or an outbound capacity at the relay node.

Example 32 includes the apparatus of Example 27, wherein the uplink congestion is a first uplink congestion and the uplink congestion indication is a first uplink congestion indication, the RAN further comprises an upstream node of the relay node; the RF interface is further to receive a second uplink congestion indication from the upstream node when a second uplink congestion occurs at the upstream node and affects uplink data transmission from the relay node, wherein the second uplink congestion indication is to identify a UE, a UE bearer, or a backhaul RLC channel affected by the second uplink congestion; and the processing circuitry is further to limit uplink data for the UE, the UE bearer, or the backhaul RLC channel affected by the second uplink congestion based on the second uplink congestion indication.

Example 33 includes the apparatus of Example 32, wherein the processing circuitry is further to: limit uplink data for the UE, the UE bearer, or the backhaul RLC channel affected by the second uplink congestion based on the second uplink congestion indication by allocating fewer resources to one or more downstream nodes corresponding to the UE, the UE bearer, or the backhaul RLC channel identified in the second uplink congestion indication.

Example 34 includes the apparatus of Example 32, wherein the processing circuitry is further to: limit uplink data for the UE, the UE bearer, or the backhaul RLC channel affected by the second uplink congestion based on the second uplink congestion indication by dropping or delaying Radio Link Control (RLC) segments corresponding to the UE, the UE bearer, or the backhaul RLC channel identified in the second uplink congestion indication.

Example 35 includes the apparatus of Example 32, wherein the processing circuitry is further to: temporarily alter prioritization based on the second uplink congestion indication such that a priority assigned to the UE, the UE bearer, or the backhaul RLC channel identified in the second uplink congestion indication is a low priority.

Example 36 includes the apparatus of any of Examples 27 to 35, wherein the relay node and the serving node are Integrated Access and Backhaul (IAB) nodes.

Example 37 includes the apparatus of any of Examples 27 to 31, wherein the relay node, the downstream node and the serving node are Integrated Access and Backhaul (IAB) nodes.

Example 38 includes the apparatus of any of Examples 32 to 35, wherein the relay node, the upstream node and the serving node are Integrated Access and Backhaul (IAB) nodes.

Example 39 includes an apparatus for a serving node in a Radio Access Network (RAN), the apparatus comprising: a radio frequency (RF) interface to receive an uplink congestion indication from a relay node in the RAN when an uplink congestion occurs at the relay node and affects uplink data for a User Equipment (UE) or one or more bearers of the UE served by the serving node, wherein the uplink congestion indication is to identify the UE, the one or more bearers of the UE, or a backhaul Radio Link Control (RLC) channel for the one or more bearers of the UE; and processing circuitry coupled with the RF interface, wherein the processing circuitry is to: limit uplink data for the UE, the one or more bearers of the UE, or the backhaul RLC channel based on the uplink congestion indication.

Example 40 includes the apparatus of Example 39, wherein the uplink congestion indication is transmitted from the relay node to the serving node using a hop-by-hop communication protocol between the relay node and the serving node.

Example 41 includes the apparatus of Example 40, wherein the uplink congestion indication is carried in an adaptation layer Protocol Data Unit (PDU) and transmitted from the relay node to the serving node according to adaptation layer routing rules.

Example 42 includes the apparatus of Example 40, wherein the uplink congestion indication is carried in a Radio Link Control (RLC) layer Protocol Data Unit (PDU) and transmitted from the relay node to the serving node according to RLC layer and adaptation layer routing rules.

Example 43 includes the apparatus of any of Examples 39 to 42, wherein the uplink congestion indication further comprises current buffer status information at the relay node, information about Protocol Data Unit (PDU) segments to be discarded due to the uplink congestion, an inbound data rate or an outbound capacity at the relay node.

Example 44 includes the apparatus of Example 39, wherein the processing circuitry is to limit the uplink data for the UE, the one or more bearers of the UE, or the backhaul RLC channel by allocating resources according to a buffer status report from the UE indicating buffered data for each bearer of the UE such that the one or more bearers are not able to be accommodated in Protocol Data Units (PDUs) transmitted by the UE.

Example 45 includes the apparatus of Example 39, wherein the processing circuitry is to limit the uplink data for the UE, the one or more bearers of the UE, or the backhaul RLC channel by discarding Radio Link Control (RLC) Protocol Data Units (PDUs) corresponding to the one or more bearers of the UE.

Example 46 includes the apparatus of Example 39, wherein the processing circuitry is to limit the uplink data for the UE, the one or more bearers of the UE, or the backhaul RLC channel by generating a message instructing the UE to reduce a data rate for the one or more bearers of the UE.

Example 47 includes the apparatus of any of Examples 39 to 46, wherein the serving node and the relay node are Integrated Access and Backhaul (IAB) nodes.

Example 48 includes a method performed at a relay node in a Radio Access Network (RAN), the method comprising: determining a downlink congestion occurs at the relay node; generating a downlink congestion indication to identify a User Equipment (UE), a UE bearer, or a backhaul Radio Link Control (RLC) channel affected by the downlink congestion; and transmitting the downlink congestion indication to a donor node in the RAN.

Example 49 includes the method of Example 48, wherein the downlink congestion indication is transmitted to the donor node using an end-to-end communication protocol between the relay node and the donor node.

Example 50 includes the method of Example 49, wherein the end-to-end communication protocol is based on an F1 interface protocol.

Example 51 includes the method of Example 48, wherein the RAN further comprises an upstream node of the relay node, the upstream node is associated with the UE, the UE bearer, or the backhaul RLC channel identified in the downlink congestion indication, and the downlink congestion indication is transmitted to the upstream node and the donor node using a hop-by-hop communication protocol between the relay node and the donor node.

Example 52 includes the method of Example 51, further comprising: generating an adaptation layer Protocol Data Unit (PDU) to carry the downlink congestion indication, and transmitting the adaptation layer PDU to the upstream node and the donor node according to adaptation layer routing rules.

Example 53 includes the method of Example 51, further comprising: generating a Radio Link Control (RLC) layer Protocol Data Unit (PDU) to carry the downlink congestion indication, and transmitting the RLC layer PDU to the upstream node and the donor node according to RLC layer and adaptation layer routing rules.

Example 54 includes the method of any of Examples 48 to 53, wherein the downlink congestion indication further comprises current buffer status information at the relay node, information about Protocol Data Unit (PDU) segments to be discarded due to the downlink congestion, and an inbound data rate or an outbound capacity at the relay node.

Example 55 includes the method of any of Examples 48 to 50, wherein the downlink congestion indication is carried in a Downlink Data Delivery Status (DDDS) message including a cause value to indicate the downlink congestion at the relay node.

Example 56 includes the method of Example 48, wherein the RAN further comprises a downstream node of the relay node, the downlink congestion is a first downlink congestion and the downlink congestion indication is a first downlink congestion indication, and wherein the method further comprises: receiving a second downlink congestion indication from the downstream node when a second downlink congestion occurs at the downstream node and affects downlink data transmission from the relay node, wherein the second downlink congestion indication is to identify a UE, a UE bearer, or a backhaul RLC channel affected by the second downlink congestion; and limiting downlink data for the UE, the UE bearer, or the backhaul RLC channel affected by the second downlink congestion based on the second downlink congestion indication.

Example 57 includes the method of Example 56, wherein the limiting downlink data for the UE, the UE bearer, or the backhaul RLC channel affected by the second downlink congestion based on the second downlink congestion indication comprises: allocating fewer resources to one or more upstream nodes corresponding to the UE, the UE bearer, or the backhaul RLC channel identified in the second downlink congestion indication.

Example 58 includes the method of Example 56, wherein the limiting downlink data for the UE, the UE bearer, or the backhaul RLC channel affected by the second downlink congestion based on the second downlink congestion indication comprises: dropping or delaying RLC segments corresponding to the UE, the UE bearer, or the backhaul RLC channel identified in the second downlink congestion indication.

Example 59 includes the method of Example 56, wherein the limiting downlink data for the UE, the UE bearer, or the backhaul RLC channel affected by the second downlink congestion based on the second downlink congestion indication comprises: temporarily altering prioritization based on the second downlink congestion indication such that a priority assigned to the UE, the UE bearer, or the backhaul RLC channel identified in the second downlink congestion indication is a low priority.

Example 60 includes the method of any of Examples 48 to 59, wherein the relay node is an Integrated Access and Backhaul (IAB) node and the donor node is an IAB donor node.

Example 61 includes the method of any of Examples 51 to 53, wherein the relay node and the upstream node are Integrated Access and Backhaul (IAB) nodes and the donor node is an IAB donor node.

Example 62 includes the method of any of Examples 56 to 59, wherein the relay node and the downstream node are Integrated Access and Backhaul (IAB) nodes and the donor node is an IAB donor node.

Example 63 includes a method performed at a donor node in a Radio Access Network (RAN), the method comprising: receiving a downlink congestion indication from a relay node in the RAN when a downlink congestion occurs at the relay node, wherein the downlink congestion indication is to identify a User Equipment (UE), a UE bearer, or a backhaul Radio Link Control (RLC) channel affected by the downlink congestion; and limiting downlink data for the UE, the UE bearer, or the backhaul RLC channel affected by the downlink congestion based on the downlink congestion indication.

Example 64 includes the method of Example 63, wherein the downlink congestion indication is transmitted from the relay node to the donor node using an end-to-end communication protocol between the relay node and the donor node.

Example 65 includes the method of Example 64, wherein the end-to-end communication protocol is based on an F1 interface protocol.

Example 66 includes the method of Example 63, wherein the downlink congestion indication is transmitted from the relay node to the donor node using a hop-by-hop communication protocol between the relay node and the donor node.

Example 67 includes the method of Example 66, wherein the downlink congestion indication is carried in an adaptation layer Protocol Data Unit (PDU) and transmitted from the relay node to the donor node according to adaptation layer routing rules.

Example 68 includes the method of Example 66, wherein the downlink congestion indication is carried in a Radio Link Control (RLC) layer Protocol Data Unit (PDU) and transmitted from the relay node to the donor node according to RLC layer and adaptation layer routing rules.

Example 69 includes the method of any of Examples 63 to 68, wherein the downlink congestion indication further comprises current buffer status information at the relay node, information about Protocol Data Unit (PDU) segments to be discarded due to the downlink congestion, an inbound data rate or an outbound capacity at the relay node.

Example 70 includes the method of any of Examples 63 to 65, wherein the downlink congestion indication is carried in a Downlink Data Delivery Status (DDDS) message including a cause value to indicate the downlink congestion at the relay node.

Example 71 includes the method of Example 63, wherein the limiting downlink data for the UE, the UE bearer, or the backhaul RLC channel affected by the downlink congestion based on the downlink congestion indication comprises: reducing a downlink data rate for the UE, the UE bearer, or the backhaul RLC channel identified in the downlink congestion indication.

Example 72 includes the method of Example 63, wherein the limiting downlink data for the UE, the UE bearer, or the backhaul RLC channel affected by the downlink congestion based on the downlink congestion indication comprises: temporarily altering prioritization such that a priority assigned to the UE, the UE bearer, or the backhaul RLC channel identified in the downlink congestion indication is a low priority.

Example 73 includes the method of any of Examples 63 to 72, wherein the relay node is an Integrated Access and Backhaul (IAB) node and the donor node is an IAB donor node.

Example 74 includes a method performed at a relay node in a Radio Access Network (RAN), the method comprising: determining an uplink congestion occurs at the relay node; and generating an uplink congestion indication to identify a User Equipment (UE), a UE bearer, or a backhaul Radio Link Control (RLC) channel affected by the uplink congestion; and transmitting the uplink congestion indication to a serving node in the RAN that serves the UE, the UE bearer, or the backhaul RLC channel identified in the uplink congestion indication.

Example 75 includes the method of Example 74, wherein the RAN further comprises a downstream node of the relay node, the downstream node is associated with the UE, the UE bearer, or the backhaul RLC channel identified in the uplink congestion indication, and the uplink congestion indication is transmitted to the downstream node and the serving node using a hop-by-hop communication protocol.

Example 76 includes the method of Example 75, further comprising: generating an adaptation layer Protocol Data Unit (PDU) to carry the uplink congestion indication, and transmitting the adaptation layer PDU to the downstream node and the serving node according to adaptation layer routing rules.

Example 77 includes the method of Example 75, further comprising: generating a Radio Link Control (RLC) layer Protocol Data Unit (PDU) to carry the uplink congestion indication, and transmitting the RLC layer PDU to the downstream node and the serving node according to RLC layer and adaptation layer routing rules.

Example 78 includes the method of any of Examples 74 to 77, wherein the uplink congestion indication further comprises current buffer status information at the relay node, information about Protocol Data Unit (PDU) segments to be discarded due to the uplink congestion, an inbound data rate or an outbound capacity at the relay node.

Example 79 includes the method of Example 74, wherein the uplink congestion is a first uplink congestion and the uplink congestion indication is a first uplink congestion indication, the RAN further comprises an upstream node of the relay node, and the method further comprises: receiving a second uplink congestion indication from the upstream node when a second uplink congestion occurs at the upstream node and affects uplink data transmission from the relay node, wherein the second uplink congestion indication is to identify a UE, a UE bearer, or a backhaul RLC channel affected by the second uplink congestion; and limiting uplink data for the UE, the UE bearer, or the backhaul RLC channel affected by the second uplink congestion based on the second uplink congestion indication.

Example 80 includes the method of Example 79, wherein the limiting uplink data for the UE, the UE bearer, or the backhaul RLC channel affected by the second uplink congestion based on the second uplink congestion indication comprises: allocating fewer resources to one or more downstream nodes corresponding to the UE, the UE bearer, or the backhaul RLC channel identified in the second uplink congestion indication.

Example 81 includes the method of Example 79, wherein the limiting uplink data for the UE, the UE bearer, or the backhaul RLC channel affected by the second uplink congestion based on the second uplink congestion indication comprises: dropping or delaying Radio Link Control (RLC) segments corresponding to the UE, the UE bearer, or the backhaul RLC channel identified in the second uplink congestion indication.

Example 82 includes the method of Example 79, wherein the limiting uplink data for the UE, the UE bearer, or the backhaul RLC channel affected by the second uplink congestion based on the second uplink congestion indication comprises: temporarily altering prioritization based on the second uplink congestion indication such that a priority assigned to the UE, the UE bearer, or the backhaul RLC channel identified in the second uplink congestion indication is a low priority.

Example 83 includes the method of any of Examples 74 to 82, wherein the relay node and the serving node are Integrated Access and Backhaul (IAB) nodes.

Example 84 includes the method of any of Examples 74 to 78, wherein the relay node, the downstream node and the serving node are Integrated Access and Backhaul (IAB) nodes.

Example 85 includes the method of any of Examples 79 to 82, wherein the relay node, the upstream node and the serving node are Integrated Access and Backhaul (IAB) nodes.

Example 86 includes a method performed at a serving node in a Radio Access Network (RAN), the method comprising: receiving an uplink congestion indication from a relay node in the RAN when an uplink congestion occurs at the relay node and affects uplink data for a User Equipment (UE) or one or more bearers of the UE served by the serving node, wherein the uplink congestion indication is to identify the UE, the one or more bearers of the UE, or a backhaul Radio Link Control (RLC) channel for the one or more bearers of the UE; and limiting uplink data for the UE, the one or more bearers of the UE, or the backhaul RLC channel based on the uplink congestion indication.

Example 87 includes the method of Example 86, wherein the uplink congestion indication is transmitted from the relay node to the serving node using a hop-by-hop communication protocol between the relay node and the serving node.

Example 88 includes the method of Example 87, wherein the uplink congestion indication is carried in an adaptation layer Protocol Data Unit (PDU) and transmitted from the relay node to the serving node according to adaptation layer routing rules.

Example 89 includes the method of Example 87, wherein the uplink congestion indication is carried in a Radio Link Control (RLC) layer Protocol Data Unit (PDU) and transmitted from the relay node to the serving node according to RLC layer and adaptation layer routing rules.

Example 90 includes the method of any of Examples 86 to 89, wherein the uplink congestion indication further comprises current buffer status information at the relay node, information about Protocol Data Unit (PDU) segments to be discarded due to the uplink congestion, an inbound data rate or an outbound capacity at the relay node.

Example 91 includes the method of Example 86, wherein the limiting uplink data for the UE, the one or more bearers of the UE, or the backhaul RLC channel based on the uplink congestion indication comprises: allocating resources according to a buffer status report from the UE indicating buffered data for each bearer of the UE such that the one or more bearers are not able to be accommodated in Protocol Data Units (PDUs) transmitted by the UE.

Example 92 includes the method of Example 86, wherein the limiting uplink data for the UE, the one or more bearers of the UE, or the backhaul RLC channel based on the uplink congestion indication comprises: discarding Radio Link Control (RLC) Protocol Data Units (PDUs) corresponding to the one or more bearers of the UE.

Example 93 includes the method of Example 86, wherein the limiting uplink data for the UE, the one or more bearers of the UE, or the backhaul RLC channel based on the uplink congestion indication comprises: generating a message instructing the UE to reduce a data rate for the one or more bearers of the UE.

Example 94 includes the method of any of Examples 86 to 93, wherein the serving node and the relay node are Integrated Access and Backhaul (IAB) nodes.

Example 95 includes an apparatus for a relay node in a Radio Access Network (RAN), the apparatus comprising: means for determining a downlink congestion occurs at the relay node; means for generating a downlink congestion indication to identify a User Equipment (UE), a UE bearer, or a backhaul Radio Link Control (RLC) channel affected by the downlink congestion; and means for transmitting the downlink congestion indication to a donor node in the RAN.

Example 96 includes the apparatus of Example 95, wherein the downlink congestion indication is transmitted to the donor node using an end-to-end communication protocol between the relay node and the donor node.

Example 97 includes the apparatus of Example 96, wherein the end-to-end communication protocol is based on an F1 interface protocol.

Example 98 includes the apparatus of Example 95, wherein the RAN further comprises an upstream node of the relay node, the upstream node is associated with the UE, the UE bearer, or the backhaul RLC channel identified in the downlink congestion indication, and the downlink congestion indication is transmitted to the upstream node and the donor node using a hop-by-hop communication protocol between the relay node and the donor node.

Example 99 includes the apparatus of Example 98, further comprising: means for generating an adaptation layer Protocol Data Unit (PDU) to carry the downlink congestion indication, and means for transmitting the adaptation layer PDU to the upstream node and the donor node according to adaptation layer routing rules.

Example 100 includes the apparatus of Example 98, further comprising: means for generating a Radio Link Control (RLC) layer Protocol Data Unit (PDU) to carry the downlink congestion indication, and means for transmitting the RLC layer PDU to the upstream node and the donor node according to RLC layer and adaptation layer routing rules.

Example 101 includes the apparatus of any of Examples 95 to 100, wherein the downlink congestion indication further comprises current buffer status information at the relay node, information about Protocol Data Unit (PDU) segments to be discarded due to the downlink congestion, and an inbound data rate or an outbound capacity at the relay node.

Example 102 includes the apparatus of any of Examples 95 to 97, wherein the downlink congestion indication is carried in a Downlink Data Delivery Status (DDDS) message including a cause value to indicate the downlink congestion at the relay node.

Example 103 includes the apparatus of Example 95, wherein the RAN further comprises a downstream node of the relay node, the downlink congestion is a first downlink congestion and the downlink congestion indication is a first downlink congestion indication, and wherein the apparatus further comprises: means for receiving a second downlink congestion indication from the downstream node when a second downlink congestion occurs at the downstream node and affects downlink data transmission from the relay node, wherein the second downlink congestion indication is to identify a UE, a UE bearer, or a backhaul RLC channel affected by the second downlink congestion; and means for limiting downlink data for the UE, the UE bearer, or the backhaul RLC channel affected by the second downlink congestion based on the second downlink congestion indication.

Example 104 includes the apparatus of Example 103, wherein the means for limiting downlink data for the UE, the UE bearer, or the backhaul RLC channel affected by the second downlink congestion based on the second downlink congestion indication comprises: means for allocating fewer resources to one or more upstream nodes corresponding to the UE, the UE bearer, or the backhaul RLC channel identified in the second downlink congestion indication.

Example 105 includes the apparatus of Example 103, wherein the means for limiting downlink data for the UE, the UE bearer, or the backhaul RLC channel affected by the second downlink congestion based on the second downlink congestion indication comprises: means for dropping or delaying RLC segments corresponding to the UE, the UE bearer, or the backhaul RLC channel identified in the second downlink congestion indication.

Example 106 includes the apparatus of Example 103, wherein the means for limiting downlink data for the UE, the UE bearer, or the backhaul RLC channel affected by the second downlink congestion based on the second downlink congestion indication comprises: means for temporarily altering prioritization based on the second downlink congestion indication such that a priority assigned to the UE, the UE bearer, or the backhaul RLC channel identified in the second downlink congestion indication is a low priority.

Example 107 includes the apparatus of any of Examples 95 to 106, wherein the relay node is an Integrated Access and Backhaul (IAB) node and the donor node is an IAB donor node.

Example 108 includes the apparatus of any of Examples 98 to 100, wherein the relay node and the upstream node are Integrated Access and Backhaul (IAB) nodes and the donor node is an IAB donor node.

Example 109 includes the apparatus of any of Examples 103 to 106, wherein the relay node and the downstream node are Integrated Access and Backhaul (IAB) nodes and the donor node is an IAB donor node.

Example 110. An apparatus for a donor node in a Radio Access Network (RAN), the apparatus comprising: means for receiving a downlink congestion indication from a relay node in the RAN when a downlink congestion occurs at the relay node, wherein the downlink congestion indication is to identify a User Equipment (UE), a UE bearer, or a backhaul Radio Link Control (RLC) channel affected by the downlink congestion; and means for limiting downlink data for the UE, the UE bearer, or the backhaul RLC channel affected by the downlink congestion based on the downlink congestion indication.

Example 111 includes the apparatus of Example 110, wherein the downlink congestion indication is transmitted from the relay node to the donor node using an end-to-end communication protocol between the relay node and the donor node.

Example 112 includes the apparatus of Example 111, wherein the end-to-end communication protocol is based on an F1 interface protocol.

Example 113 includes the apparatus of Example 110, wherein the downlink congestion indication is transmitted from the relay node to the donor node using a hop-by-hop communication protocol between the relay node and the donor node.

Example 114 includes the apparatus of Example 113, wherein the downlink congestion indication is carried in an adaptation layer Protocol Data Unit (PDU) and transmitted from the relay node to the donor node according to adaptation layer routing rules.

Example 115 includes the apparatus of Example 113, wherein the downlink congestion indication is carried in a Radio Link Control (RLC) layer Protocol Data Unit (PDU) and transmitted from the relay node to the donor node according to RLC layer and adaptation layer routing rules.

Example 116 includes the apparatus of any of Examples 110 to 115, wherein the downlink congestion indication further comprises current buffer status information at the relay node, information about Protocol Data Unit (PDU) segments to be discarded due to the downlink congestion, an inbound data rate or an outbound capacity at the relay node.

Example 117 includes the apparatus of any of Examples 110 to 112, wherein the downlink congestion indication is carried in a Downlink Data Delivery Status (DDDS) message including a cause value to indicate the downlink congestion at the relay node.

Example 118 includes the apparatus of Example 110, wherein the means for limiting downlink data for the UE, the UE bearer, or the backhaul RLC channel affected by the downlink congestion based on the downlink congestion indication comprises: means for reducing a downlink data rate for the UE, the UE bearer, or the backhaul RLC channel identified in the downlink congestion indication.

Example 119 includes the apparatus of Example 110, wherein the means for limiting downlink data for the UE, the UE bearer, or the backhaul RLC channel affected by the downlink congestion based on the downlink congestion indication comprises: means for temporarily altering prioritization such that a priority assigned to the UE, the UE bearer, or the backhaul RLC channel identified in the downlink congestion indication is a low priority.

Example 120 includes the apparatus of any of Examples 110 to 119, wherein the relay node is an Integrated Access and Backhaul (IAB) node and the donor node is an IAB donor node.

Example 121 includes an apparatus for a relay node in a Radio Access Network (RAN), the apparatus comprising: means for determining an uplink congestion occurs at the relay node; and means for generating an uplink congestion indication to identify a User Equipment (UE), a UE bearer, or a backhaul Radio Link Control (RLC) channel affected by the uplink congestion; and means for transmitting the uplink congestion indication to a serving node in the RAN that serves the UE, the UE bearer, or the backhaul RLC channel identified in the uplink congestion indication.

Example 122 includes the apparatus of Example 121, wherein the RAN further comprises a downstream node of the relay node, the downstream node is associated with the UE, the UE bearer, or the backhaul RLC channel identified in the uplink congestion indication, and the uplink congestion indication is transmitted to the downstream node and the serving node using a hop-by-hop communication protocol.

Example 123 includes the apparatus of Example 122, further comprising: means for generating an adaptation layer Protocol Data Unit (PDU) to carry the uplink congestion indication, and means for transmitting the adaptation layer PDU to the downstream node and the serving node according to adaptation layer routing rules.

Example 124 includes the apparatus of Example 122, further comprising: means for generating a Radio Link Control (RLC) layer Protocol Data Unit (PDU) to carry the uplink congestion indication, and means for transmitting the RLC layer PDU to the downstream node and the serving node according to RLC layer and adaptation layer routing rules.

Example 125 includes the apparatus of any of Examples 121 to 124, wherein the uplink congestion indication further comprises current buffer status information at the relay node, information about Protocol Data Unit (PDU) segments to be discarded due to the uplink congestion, an inbound data rate or an outbound capacity at the relay node.

Example 126 includes the apparatus of Example 121, wherein the uplink congestion is a first uplink congestion and the uplink congestion indication is a first uplink congestion indication, the RAN further comprises an upstream node of the relay node, and the apparatus further comprises: means for receiving a second uplink congestion indication from the upstream node when a second uplink congestion occurs at the upstream node and affects uplink data transmission from the relay node, wherein the second uplink congestion indication is to identify a UE, a UE bearer, or a backhaul RLC channel affected by the second uplink congestion; and means for limiting uplink data for the UE, the UE bearer, or the backhaul RLC channel affected by the second uplink congestion based on the second uplink congestion indication.

Example 127 includes the apparatus of Example 126, wherein the means for limiting uplink data for the UE, the UE bearer, or the backhaul RLC channel affected by the second uplink congestion based on the second uplink congestion indication comprises: means for allocating fewer resources to one or more downstream nodes corresponding to the UE, the UE bearer, or the backhaul RLC channel identified in the second uplink congestion indication.

Example 128 includes the apparatus of Example 126, wherein the means for limiting uplink data for the UE, the UE bearer, or the backhaul RLC channel affected by the second uplink congestion based on the second uplink congestion indication comprises: means for dropping or delaying Radio Link Control (RLC) segments corresponding to the UE, the UE bearer, or the backhaul RLC channel identified in the second uplink congestion indication.

Example 129 includes the apparatus of Example 126, wherein the means for limiting uplink data for the UE, the UE bearer, or the backhaul RLC channel affected by the second uplink congestion based on the second uplink congestion indication comprises: means for temporarily altering prioritization based on the second uplink congestion indication such that a priority assigned to the UE, the UE bearer, or the backhaul RLC channel identified in the second uplink congestion indication is a low priority.

Example 130 includes the apparatus of any of Examples 121 to 129, wherein the relay node and the serving node are Integrated Access and Backhaul (IAB) nodes.

Example 131 includes the apparatus of any of Examples 121 to 125, wherein the relay node, the downstream node and the serving node are Integrated Access and Backhaul (IAB) nodes.

Example 132 includes the apparatus of any of Examples 126 to 129, wherein the relay node, the upstream node and the serving node are Integrated Access and Backhaul (IAB) nodes.

Example 133 includes an apparatus for a serving node in a Radio Access Network (RAN), the apparatus comprising: means for receiving an uplink congestion indication from a relay node in the RAN when an uplink congestion occurs at the relay node and affects uplink data for a User Equipment (UE) or one or more bearers of the UE served by the serving node, wherein the uplink congestion indication is to identify the UE, the one or more bearers of the UE, or a backhaul Radio Link Control (RLC) channel for the one or more bearers of the UE; and means for limiting uplink data for the UE, the one or more bearers of the UE, or the backhaul RLC channel based on the uplink congestion indication.

Example 134 includes the apparatus of Example 133, wherein the uplink congestion indication is transmitted from the relay node to the serving node using a hop-by-hop communication protocol between the relay node and the serving node.

Example 135 includes the apparatus of Example 134, wherein the uplink congestion indication is carried in an adaptation layer Protocol Data Unit (PDU) and transmitted from the relay node to the serving node according to adaptation layer routing rules.

Example 136 includes the apparatus of Example 134, wherein the uplink congestion indication is carried in a Radio Link Control (RLC) layer Protocol Data Unit (PDU) and transmitted from the relay node to the serving node according to RLC layer and adaptation layer routing rules.

Example 137 includes the apparatus of any of Examples 133 to 136, wherein the uplink congestion indication further comprises current buffer status information at the relay node, information about Protocol Data Unit (PDU) segments to be discarded due to the uplink congestion, an inbound data rate or an outbound capacity at the relay node.

Example 138 includes the apparatus of Example 133, wherein the means for limiting uplink data for the UE, the one or more bearers of the UE, or the backhaul RLC channel based on the uplink congestion indication comprises: means for allocating resources according to a buffer status report from the UE indicating buffered data for each bearer of the UE such that the one or more bearers are not able to be accommodated in Protocol Data Units (PDUs) transmitted by the UE.

Example 139 includes the apparatus of Example 133, wherein the means for limiting uplink data for the UE, the one or more bearers of the UE, or the backhaul RLC channel based on the uplink congestion indication comprises: means for discarding Radio Link Control (RLC) Protocol Data Units (PDUs) corresponding to the one or more bearers of the UE.

Example 140 includes the apparatus of Example 133, wherein the means for limiting uplink data for the UE, the one or more bearers of the UE, or the backhaul RLC channel based on the uplink congestion indication comprises: means for generating a message instructing the UE to reduce a data rate for the one or more bearers of the UE.

Example 141 includes the apparatus of any of Examples 133 to 140, wherein the serving node and the relay node are Integrated Access and Backhaul (IAB) nodes.

Example 142 includes a non-transitory computer-readable medium having instructions stored thereon, the instructions, when executed by one or more processors of a relay node, causing the one or more processors to perform the method of any of Examples 48 to 62 and 74 to 85.

Example 143 includes a non-transitory computer-readable medium having instructions stored thereon, the instructions, when executed by one or more processors of a donor node, causing the one or more processors to perform the method of any of Examples 63 to 73.

Example 144 includes a non-transitory computer-readable medium having instructions stored thereon, the instructions, when executed by one or more processors of a serving node, causing the one or more processors to perform the method of any of Examples 86 to 94.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A relay node in a Radio Access Network (RAN) comprising:
    a radio frequency (RF) interface configured to receive and transmit downlink data for one or more User Equipments (UEs) or UE bearers; and
    processing circuitry coupled with the RF interface,
    wherein the processing circuitry is configured to:
        determine whether a downlink congestion occurs at the relay node; and
        generate a downlink congestion indication to identify a UE, a UE bearer, or a backhaul Radio Link Control (RLC) channel affected by the downlink congestion, wherein the downlink congestion indication comprises at least one of UE bearer specific ID, UE specific ID, or Route ID; and
    the RF interface is configured to transmit the downlink congestion indication to a donor node in the RAN to alter prioritization of the UE, the UE bearer, or the backhaul RLC channel to reduce a downlink data rate for the UE, the UE bearer, or the backhaul RLC channel based on the downlink congestion indication, wherein the downlink congestion indication is transmitted in accordance with an adaptation layer protocol, wherein the adaptation layer protocol is below an RLC layer.

2. The relay node of claim 1, wherein the downlink congestion indication is transmitted to the donor node using an end-to-end communication protocol between the relay node and the donor node.

3. The relay node of claim 1, wherein the RAN further comprises an upstream node of the relay node, wherein the upstream node is associated with the UE, the UE bearer, or the backhaul RLC channel identified in the downlink congestion indication, and the downlink congestion indication is transmitted to the upstream node and the donor node using a hop-by-hop communication protocol between the relay node and the donor node.

4. The relay node of claim 3, wherein the processing circuitry is further configured to:
    generate an adaptation layer Protocol Data Unit (PDU) to carry the downlink congestion indication, and
    the RF interface is further configured to:
        transmit the adaptation layer PDU to the upstream node and the donor node according to adaptation layer routing rules.

5. The relay node of claim 3, wherein the processing circuitry is further configured to:
    generate an RLC layer Protocol Data Unit (PDU) to carry the downlink congestion indication, and
    the RF interface is further configured to:
        transmit the RLC layer PDU to the upstream node and the donor node according to RLC layer and adaptation layer routing rules.

6. The relay node of claim 1, wherein the downlink congestion indication is carried in a Downlink Data Delivery Status (DDDS) message including a cause value to indicate the downlink congestion at the relay node.

7. The relay node of claim 1, wherein the RAN further comprises a downstream node of the relay node, and wherein the downlink congestion is a first downlink congestion and the downlink congestion indication is a first downlink congestion indication;
    the RF interface is further configured to receive a second downlink congestion indication from the downstream node when a second downlink congestion occurs at the downstream node and affects downlink data transmission from the relay node, wherein the second downlink congestion indication is to identify a second UE, a second UE bearer, or a second backhaul RLC channel affected by the second downlink congestion; and
    the processing circuitry is further configured to:
        alter prioritization of the second UE, the second UE bearer, or the second backhaul RLC channel to receive the downlink data based on the second downlink congestion indication; and
        limit the downlink data for the second UE, the second UE bearer, or the second backhaul RLC channel affected by the second downlink congestion based on the second downlink congestion indication.

8. The relay node of claim 1, wherein the relay node is an Integrated Access and Backhaul (IAB) node and the donor node is an IAB donor node.

9. A donor node in a Radio Access Network (RAN), comprising:
    a radio frequency (RF) interface configured to receive a downlink congestion indication from a relay node in the RAN when a downlink congestion occurs at the relay node, wherein the downlink congestion indication identifies a User Equipment (UE), a UE bearer, or a backhaul Radio Link Control (RLC) channel affected by the downlink congestion, wherein the downlink congestion indication comprises at least one of UE bearer specific ID, UE specific ID, or Route ID, wherein the downlink congestion indication is generated in accordance with an adaptation layer protocol, wherein the adaptation layer protocol is below an RLC layer; and
    processing circuitry coupled with the RF interface, wherein the processing circuitry is configured to:
        alter prioritization of the UE, the UE bearer, or the backhaul RLC channel to reduce a downlink data rate for the UE, the UE bearer, or the backhaul RLC channel based on the downlink congestion indication; and
        limit downlink data for the UE, the UE bearer, or the backhaul RLC channel affected by the downlink congestion based on the downlink congestion indication.

10. The donor node of claim 9, wherein the downlink congestion indication is transmitted from the relay node to the donor node using an end-to-end communication protocol between the relay node and the donor node.

11. The donor node of claim 9, wherein the downlink congestion indication is transmitted from the relay node to the donor node using a hop-by-hop communication protocol between the relay node and the donor node.

12. The donor node of claim 11, wherein the downlink congestion indication is carried in an adaptation layer Protocol Data Unit (PDU) and transmitted from the relay node to the donor node according to adaptation layer routing rules.

13. The donor node of claim 11, wherein the downlink congestion indication is carried in an RLC layer Protocol Data Unit (PDU) and transmitted from the relay node to the donor node according to RLC layer and adaptation layer routing rules.

14. The donor node of claim 9, wherein the downlink congestion indication is carried in a Downlink Data Delivery Status (DDDS) message including a cause value to indicate the downlink congestion at the relay node.

15. The donor node claim 9, wherein the relay node is an Integrated Access and Backhaul (IAB) node and the donor node is an IAB donor node.

16. A non-transitory computer-readable medium having instructions stored thereon, the instructions, when executed by one or more processors of a relay node in a Radio Access Network (RAN), causing the one or more processors to:
   determine whether an uplink congestion occurs at the relay node;
   generate an uplink congestion indication to identify a user equipment (UE) or a UE bearer or a backhaul Radio Link Control (RLC) channel affected by the uplink congestion, wherein the uplink congestion indication comprises at least one of UE bearer specific ID, UE specific ID, or Route ID; and
   transmit the uplink congestion indication to a serving node in the RAN that serves the UE or the UE bearer or the backhaul RLC channel identified in the uplink congestion indication to alter prioritization of the UE, the UE bearer, or the backhaul RLC channel to reduce an uplink data rate for the UE, the UE bearer, or the backhaul RLC channel to transmit uplink data based on the uplink congestion indication, wherein the uplink congestion indication is transmitted in accordance with an adaptation layer protocol, wherein the adaptation layer protocol is below an RLC layer.

17. The non-transitory computer-readable medium of claim 16, wherein the RAN further comprises a downstream node of the relay node, wherein the downstream node is associated with the UE or the UE bearer or the backhaul RLC channel identified in the uplink congestion indication, and the uplink congestion indication is transmitted to the downstream node and the serving node using a hop-by-hop communication protocol.

18. The non-transitory computer-readable medium of claim 17, wherein the instructions, when executed by the one or more processors, cause the one or more processors to further:
   generate an adaptation layer Protocol Data Unit (PDU) to carry the uplink congestion indication;
   transmit the adaptation layer PDU to the downstream node and the serving node according to adaptation layer routing rules.

19. The non-transitory computer-readable medium of claim 17, wherein the instructions, when executed by the one or more processors, cause the one or more processors to further:
   generate an RLC layer Protocol Data Unit (PDU) to carry the uplink congestion indication; and
   transmit the RLC layer PDU to the downstream node and the serving node according to RLC layer and adaptation layer routing rules.

20. The non-transitory computer-readable medium of claim 16, wherein the uplink congestion is a first uplink congestion and the uplink congestion indication is a first uplink congestion indication, and wherein the RAN further comprises an upstream node of the relay node;
   the instructions, when executed by the one or more processors, cause the one or more processors to further:
   receive a second uplink congestion indication from the upstream node when a second uplink congestion occurs at the upstream node and affects uplink data transmission from the relay node, wherein the second uplink congestion indication is to identify a second UE or a second UE bearer or a second backhaul RLC channel affected by the second uplink congestion;
   alter prioritization of the second UE, the second UE bearer, or the second backhaul RLC channel to transmit the uplink data based on the second uplink congestion indication; and
   limit the uplink data for the second UE or the second UE bearer or the second backhaul RLC channel affected by the second uplink congestion based on the second uplink congestion indication.

* * * * *